(12) United States Patent
Niemeyer et al.

(10) Patent No.: US 9,573,416 B1
(45) Date of Patent: Feb. 21, 2017

(54) WHEEL ASSEMBLY WITH MULTI-SPHERE OMNIWHEELS AND OMNIDIRECTIONAL DEVICES INCLUDING THE WHEEL ASSEMBLY

(71) Applicant: DISNEY ENTERPRISES, INC., Burbank, CA (US)

(72) Inventors: Gunter D. Niemeyer, Pasadena, CA (US); Lanny S. Smoot, Thousand Oaks, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/920,930

(22) Filed: Oct. 23, 2015

(51) Int. Cl.
*B60B 19/00* (2006.01)
*B60B 19/14* (2006.01)

(52) U.S. Cl.
CPC .......... *B60B 19/003* (2013.01); *B60B 19/14* (2013.01)

(58) Field of Classification Search
CPC .................................. B60B 19/003; B60B 19/14
See application file for complete search history.

(56) References Cited

U.S. PATENT DOCUMENTS

| | | | | |
|---|---|---|---|---|
| 4,733,737 A * | 3/1988 | Falamak | ................ | B62D 7/026 180/252 |
| 5,374,879 A * | 12/1994 | Pin | ................ | B25J 5/007 180/21 |
| 7,730,978 B2 * | 6/2010 | Dixon | ................ | B25J 5/007 180/7.1 |
| 9,004,202 B2 * | 4/2015 | Riwan | ................ | B60B 19/003 180/7.1 |
| 2014/0152803 A1 * | 6/2014 | Carlson | ................ | G01N 21/954 348/84 |
| 2015/0123451 A1 * | 5/2015 | Nelson | ................ | B60B 19/003 301/6.5 |
| 2015/0129340 A1 * | 5/2015 | Maisonnier | ............. | B60B 19/14 180/210 |

* cited by examiner

*Primary Examiner* — Kevin Hurley
(74) *Attorney, Agent, or Firm* — Marsh Fischmann & Breyfogle LLP; Kent A. Lembke

(57) ABSTRACT

An omniwheel is presented that may be included with additional omniwheels in a wheel assembly, which can be used in nearly any omnidirectional device such as a robot, a park ride or other vehicle, and the like. The omniwheel includes a wheel support or frame, and a first roller pivotally supported on the wheel support. Further, the omniwheel includes a second roller pivotally supported on the wheel support. The first and second rollers are each generally spherical in shape and have equal outer diameters. The first and second rollers each has a pair of recessed contact surfaces at opposite poles. Each of the first and second rollers is supported in the wheel support for freewheeling about a rotation axis passing through the opposite poles, and the first and second rollers are oriented in the wheel support to have their rotation axes offset relative to each other by an offset angle.

19 Claims, 23 Drawing Sheets

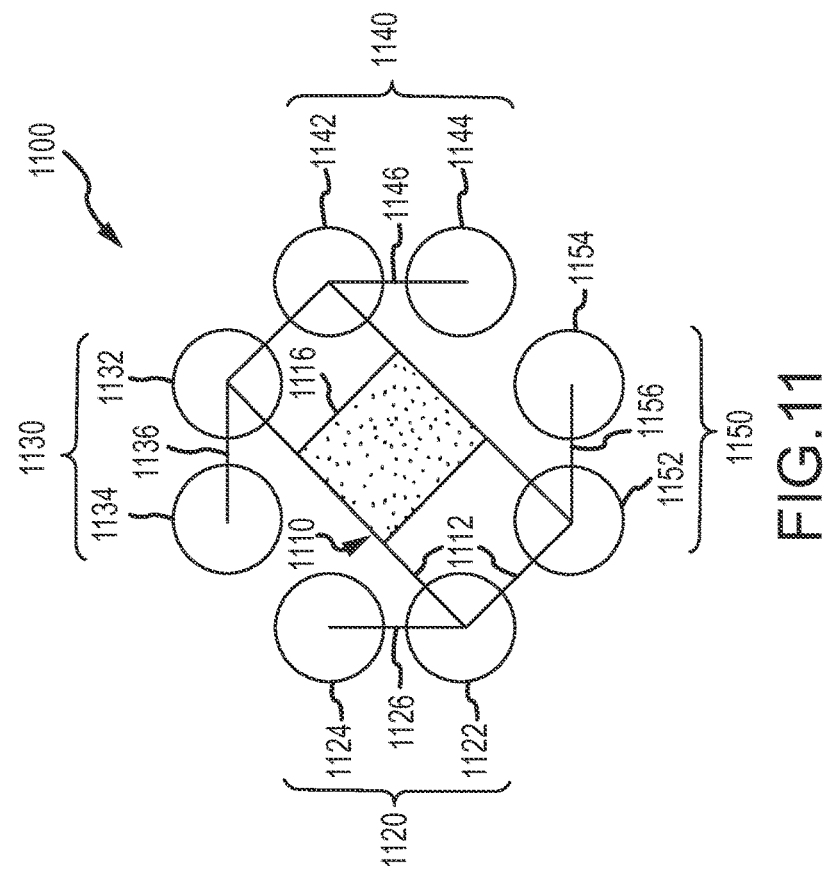
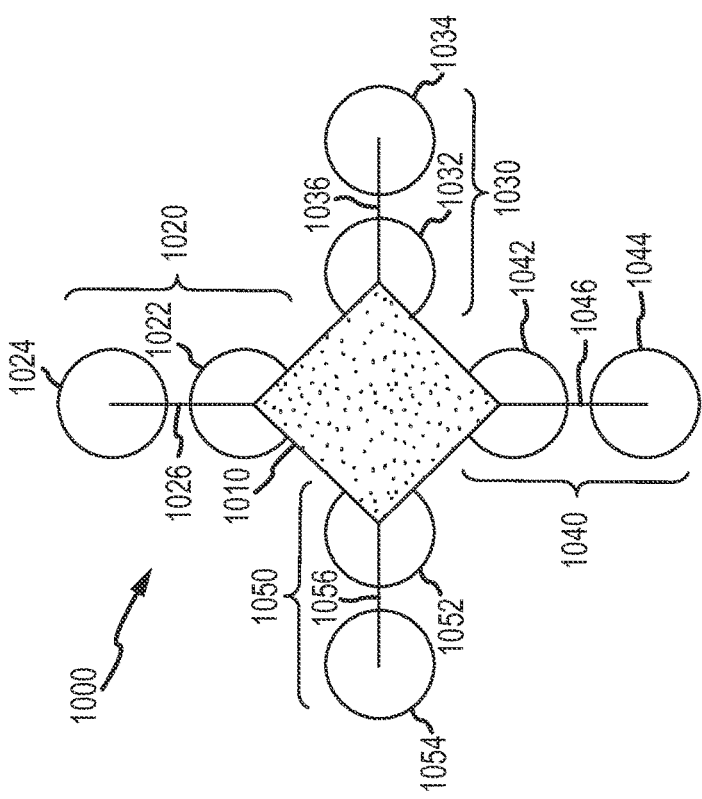
FIG. 11
FIG. 10

US 9,573,416 B1

WHEEL ASSEMBLY WITH MULTI-SPHERE OMNIWHEELS AND OMNIDIRECTIONAL DEVICES INCLUDING THE WHEEL ASSEMBLY

BACKGROUND

1. Field of the Description

The present description relates, in general, to designs for omniwheels and omnidirectional vehicles (or other omnidirectional devices), and, more particularly, to a wheel assembly with multi-sphere omniwheels (e.g., two or more spherically shaped rollers or "sub-wheels" make up each omniwheel of the wheel assembly) that can be used in any omnidirectional device such as an omnidirectional vehicle for use in an amusement park ride or omnidirectional apparatus for moving objects over both smooth and rough or contoured surfaces, which can be problematic for conventional omniwheels to smoothly traverse.

2. Relevant Background

Omniwheels (or omnidirectional wheels, poly wheels, or the like) have been in use for many years and are often employed in holonomic drive systems. Well-known omniwheels are wheels with small discs or rollers around the circumference or rim of a larger wheel (or the omniwheel hub), and small discs or rollers provide the contact surface for the omniwheel and are arranged, typically, to be perpendicular to the turning direction. The effect is that the omniwheel can be driven with full force by rotating a shaft along the major axis of the omniwheel while still being able to slide laterally via free or undriven rotation of the small discs or rollers about their minor axes.

In general, omnidirectional wheels or omniwheels allow movements of a supported vehicle or object in all directions (i.e., forward/backward, sideways, and spin) freely and immediately. In particular, omnidirection wheels allow a vehicle or supported object to move sideways without the intermediate maneuvers that are need for "parallel parking" a vehicle with conventional wheels. Mathematically, omniwheels are holonomic wheels while conventional wheels are nonholonomic. As noted above, omniwheels generally include a large wheel or hub that is rimmed with smaller rollers around the circumference, and the rollers are set perpendicularly to the major axis of the large wheel or hub. In forward/backward motions, the large wheel or hub rotates about the major axis and presents a large diameter with minimal friction and the ability to overcome obstacles such as bumps on a surface. In sideways motions, the typically much smaller rollers present a smaller diameter than the large wheel or hub and, as a result, often are unable to overcome obstacles including relatively small bumps in a surface over which the omniwheel is rolling. Effectively, traditional omniwheels are asymmetric as the ratio of the largest diameter (e.g., of the main/large wheel or hub) to the smallest diameter (e.g., of the smaller roller) determines the uniformity.

A design challenge arises when it is desired to provide a wheel (and suspension in many cases) system that can allow a vehicle or object supported by the wheel system to move in all directions over a bumpy surface. Traditional wheels (not omniwheels) can overcome bumps on a surface with ease, and currently available omniwheels can move in all directions. However, the combination of these two capabilities has not yet been effectively achieved as currently available omniwheels cannot overcome bumps in all directions (e.g., rolling or sliding on the smaller rollers is not effective on a surface with any significant bumps. Also, conventional omniwheels tend to be relatively complex to fabricate and control/drive and often do not provide a smooth contact surface (e.g., due to spaces between the smaller rollers on the circumference or rim of the larger wheel).

FIGS. 1-6 illustrate examples of currently available omniwheels, and each is useful for providing multidirectional movement on a smooth, flat surface but can have problems on a bumpy or rough surface. FIG. 1 illustrates an omnidirectional wheel 100 with a main/larger wheel or hub 110 with a center hole or opening 115 to allow the omnidirectional wheel 100 to be attached to a drive shaft or axle (not shown) for driving the omnidirectional wheel to rotate about the major axis, $Axis_{Major}$, of the larger wheel or hub 110. A plurality of smaller rollers 120 (e.g., fourteen rollers) are provided in a spaced apart arrangement about the circumference (or outer rim) of the larger wheel/hub 110. The rollers 120 provide a contact surface for the omnidirectional wheel 110 (i.e., traditional omniwheels are designed to provide a single contact point) and rotate about an axis, $Axis_{Minor}$, that is in a plane perpendicular to the rotation axis, $Axis_{Major}$, of the larger wheel/hub 110. It should be understood that rollers 120 are sized to have a diameter that is much smaller than the diameter of the larger wheel/hub 110. Obstacles that can be successfully forded in the sideways direction (parallel to the main rotation axis, $Axis_{Major}$) are, therefore, much smaller than the ones that can be overcome in the forward direction during rotation of the larger wheel/hub 110. This can significantly decrease the usability of the omniwheel 100 on rough or bumpy surfaces or to overcome surface obstacles.

FIG. 2 illustrates an omniwheel 200 made up of a set of three side-by-side larger wheels/hubs 210 with holes/openings 215 for a draft shaft (not shown) for driving the larger wheels/hubs 210 to rotate about a rotation axis, $Axis_{Major}$. Each of the wheels/hubs 210 includes a number of rollers 220 on their outer rim, and each of the rollers 220 is configured to rotate freely about an axis, $Axis_{Minor}$, that is in a plane perpendicular to the rotation axis, $Axis_{Major}$, of the larger wheel/hub 210. The wheels/hubs 210 are arranged so that their rollers 220 are offset from each other (e.g., the rollers 220 are provided in multiple layers to provide a more continuous contact surface). FIG. 3 also presents an omniwheel 300 with a hub/larger wheel 310 with a center hole 315 to allow it to be rotated by a shaft/axle (not shown) about its rotation axis, $Axis_{Major}$. A number of layered and offset rollers 320 are provided about the outer rim of the larger wheel/hub 310 and each rotates about a longitudinal axis, $Axis_{Minor}$, of the roller 320. In each of the omnidirectional wheels 200 and 300, the diameters of the rollers 220 and 320 has to be much smaller than the diameter of the larger wheel/hubs 210 and 310.

FIG. 4 illustrates another design for an omniwheel 400 that includes a larger wheel or hub 410 with a central hole/opening 415 to allow the hub 410 to be affixed to a drive shaft (not shown) to rotate/drive the omniwheel about the main rotation axis, $Axis_{Major}$, passing through the opening/hole 415. Further, a plurality of overlapping rollers 420 and 425 are provided on the circumferential surface or rim of the larger wheel or hub 410 and each is adapted to rotate about its longitudinal axis, $Axis_{Minor}$, which each are in a plane that is perpendicular to the main rotation axis, $Axis_{Major}$, of the omniwheel 400. The omniwheel 400 may be considered an extra-smooth omniwheel that more accurately approximates the shape of a circular wheel with its contact surfaces provided (one at a time) by the rollers 420 and 425. To keep a single layer, this design necessarily has small diameter rollers 425 and larger diameter rollers 420, and the ability to ford or overcome bumps or obstacles is limited by the smaller diameter of the rollers 425.

FIGS. 5A and 5B show top and side views, respectively, of a spherically-shaped omniwheel 500 which is supported and can be driven by shaft 516 to rotate about an axis, $Axis_{Major}$. Two sphere halves 520 are mounted on shaft 516 and rotate about an axis, $Axis_{Minor}$, that is perpendicular to the major rotation axis, $Axis_{Major}$. At each spaced apart end of the sphere halves 520, smaller diameter rollers 525 are provided and mounted to rotate about an axis, $Axis_{Minor2}$, that is perpendicular to both the major rotation axis, $Axis_{Major}$, and the first minor axis, $Axis_{Minor1}$. In the omniwheel 500, the large diameter rollers 520 have become as large as the diameter of the omniwheel 500. In balance, the small diameter rollers 525 have become tiny or much, much smaller than the diameter of the omniwheel 500, and, as a result, the design looks like it would be smoother than many other designs. However, when the smaller rollers 525 hit obstacles, even the smallest obstacles (smallest dips or bumps in a surface) may undesirably stop the rolling of the omniwheel 500.

FIG. 6 shows another design for an omnidirectional wheel 600 with a larger wheel or hub 610 that can be driven to rotate about its rotation axis, $Axis_{Major}$. About the peripheral surface or rim of this larger wheel or hub 610, a plurality of free-rotating rollers 620 are provided that each rotates about its longitudinal axis, $Axis_{Minor}$. In the omnidirectional wheel 600, the smaller diameter rollers 620 are positioned at 45 degree angles rather than in the plane of the hub 610. This allows a torque applied about the driven hub axis, $Axis_{Major}$, to create ground forces outside the plane of the hub, and a vehicle supported by multiple parallel wheels 600 can be actively driven sideways relative to the wheels. However, the small diameter of the rollers 620 accentuates the asymmetry of the omniwheel 600 making it unsuited for many bumpy surfaces or for fording many obstacles that may be on a surface.

Hence, there remains a need for an improved omniwheel or omniwheel assembly providing two or more omniwheels that provides a more smooth contact surface (or "ride"), is less complex to fabricate and control/drive, and, significantly, is able to move easily in all directions on both smooth and bumpy/rough surfaces. Preferably such omniwheels or omniwheel assemblies would be adapted for use in "all-terrain" omnidirectional devices (e.g., omnidirectional vehicles) that more easily overcome obstacles or bumps on a surface. Since the omniwheels preferably are more simple in design, fabrication, and use than existing omniwheels, it is likely that the new omniwheels will be more robust and more useful in less controlled environments such that the new omniwheels will find application in a large variety of domains beyond robots such as in omnidirectional vehicles (for amusement park rides and other applications/environments).

SUMMARY

An omnidirectional wheel assembly is presented that can be used in omnidirectional devices. The omnidirectional devices or systems may take a wide variety of forms such as omnidirectional vehicles that may be used in amusement park rides, such as robots supported upon the omnidirectional wheel assembly, and such as nearly any object supported on a platform or base connected to one of the omnidirectional wheel assemblies described herein (e.g., forklifts (omnidirectional devices with driven omniwheels) to shopping carts (an object or component supported on non-motorized or driven omniwheels)).

Briefly, the omnidirectional wheel assembly includes two or more omniwheels, and each of these omniwheels includes two or more spherical rollers. For example, one embodiment of the new omnidirectional wheel assembly uses a pair of spherical rollers or spheres for each of its four omniwheels. The spherical rollers of each pair are the same size (i.e., each roller has the same outer diameter) such that the omniwheels of the omnidirectional wheel assembly do not include smaller diameter rollers that can become stuck on bumps or other obstacles. In other words, the wheel assemblies are designed so as to replace conventional omniwheels with pairs of equal-sized, sphere-shaped rollers. Without any small diameter rollers as found in prior omniwheel assemblies, the omnidirectional devices (e.g., park ride vehicles, robots, and so on) using the new omnidirectional wheel assembly can be used on planar and rough/bumpy surfaces as the new omniwheels can overcome obstacles in all directions.

More particularly, an omniwheel is presented that may be included with additional omniwheels in a wheel assembly, which can be used in nearly any omnidirectional device such as a robot, a park ride or other vehicle, and the like. The omniwheel includes a wheel support or frame, and a first roller pivotally supported on the wheel support. Further, the omniwheel includes a second roller pivotally supported on the wheel support. The first and second rollers are each generally spherical in shape and have equal outer diameters. Additionally, the first and second rollers each has a pair of recessed contact surfaces at opposite poles (e.g., where polar caps or poles have been removed or at least "trimmed" to provide clearance). Also, each of the first and second rollers is supported in the wheel support for freewheeling about a rotation axis passing through the opposite poles, and the first and second rollers are oriented in the wheel support to have their rotation axes offset relative to each other by an offset angle. The first and second rollers may be arranged inline on the wheel support or be provided side-by-side to address scrubbing, and the offset angle is an angle in the range of 45 to 90 degrees.

In some embodiments, the offset angle is 90 degrees, and each of the recessed contact surfaces is located a maximum depth from the outer diameter of the first or second roller by a distance less than about 15 percent of the outer diameter (e.g., for about 29 percent or less removal overall to ensure ongoing contact). In other cases, though, the offset angle is between 45 and 60 degrees, and each of the recessed contact surfaces is located a maximum depth from the outer diameter of the first or second roller by a distance greater than about 15 percent of the outer diameter.

In the same or other implementations, each of the first and second rollers is made up of a pair of hemispherically-shaped body portions each including one of the recessed contact surfaces. In these implementations, the omniwheel may further include an elongated shaft pivotally supported by the wheel support and extending transverse to the rotation axes of the first and second rollers. Then, the first and second rollers can be affixed to the elongated shaft, with the elongated shaft sandwiched between the pair of hemispherically-shaped body portions of each of the first and second rollers (e.g., between two inner surfaces of the body portions), whereby the first and second rollers are pivotable with the elongated shaft such as about a major or main rotation axis of the omniwheel.

In other cases, though, the omniwheel includes a pair of parallel and spaced apart shafts pivotally supported by the wheel support. In such cases, each of the first and second rollers is supported upon a differing one of the shafts extending between the pair of hemispherically-shaped body portions, with the shafts having 1:1 coupling (e.g., such as through the use of gears, belts, or software-based control of driving of these shafts).

In some cases, the omniwheel includes a third roller positioned between the first and second rollers in an inline or side-by-side arrangement. With three rollers, the offset angle between the first and third rollers may be 60 degrees while the offset angle between the third and second rollers is also 60 degrees. To facilitate use of the omniwheel on a curved surface, the third roller may be an outer diameter that is less than the outer diameter of the first and second rollers.

BRIEF DESCRIPTION OF THE DRAWINGS

FIG. 10 illustrates a top view of a 4-legged wheel assembly showing its guaranteed area of support;

FIG. 11 illustrates a top view of a wheel assembly using an octagon configuration of the rollers of the omniwheels to provide a guaranteed area of support;

DETAILED DESCRIPTION

Briefly, the present description is directed toward a new design for an omnidirectional wheel assembly and to omnidirectional devices that incorporate such omnidirectional wheel assemblies. Each omnidirectional wheel assembly includes two or more omniwheels that each includes at least a pair of spherically shaped rollers that are mounted (in a spaced apart arrangement) upon a common drive shaft (e.g., one main drive shaft, axle, or support rod for each omniwheel) and driven by rotation of the drive shaft. The spheres or spherical rollers are of equal size (i.e., have equal outer diameters) to avoid problems with sticking on bumps or obstacles caused by use of smaller diameter rollers placed on an outer rim as was the case with conventional omniwheels. Hence, there is no "small roller" as in conventional omniwheels as both rollers are of the same size (or the "small roller" is as large as the "large roller"). Also, prior or conventional omniwheels have a preferred direction (e.g., to roll with the larger roller or hub), but the omnidirectional wheels avoid this problem with use of spheres, which have the same radius in any direction.

The inventors understood that an ideal omniwheel design could be provided with a completely spherical wheel that would rotate around a single point in the middle of the spherical wheel. Such a spherical wheel would roll smoothly and evenly in all directions and be able to crest obstructions that are for instance one fourth (or 25 percent) of the sphere's height (or outer diameter) in all directions. The inventors also understood, though, that while this example of an ideal omniwheel is instructive, it is not implementable in practice because the single support point cannot be suspended or supported from outside the spherical wheel without interfering with operation of the spherical wheel.

Figure 1:
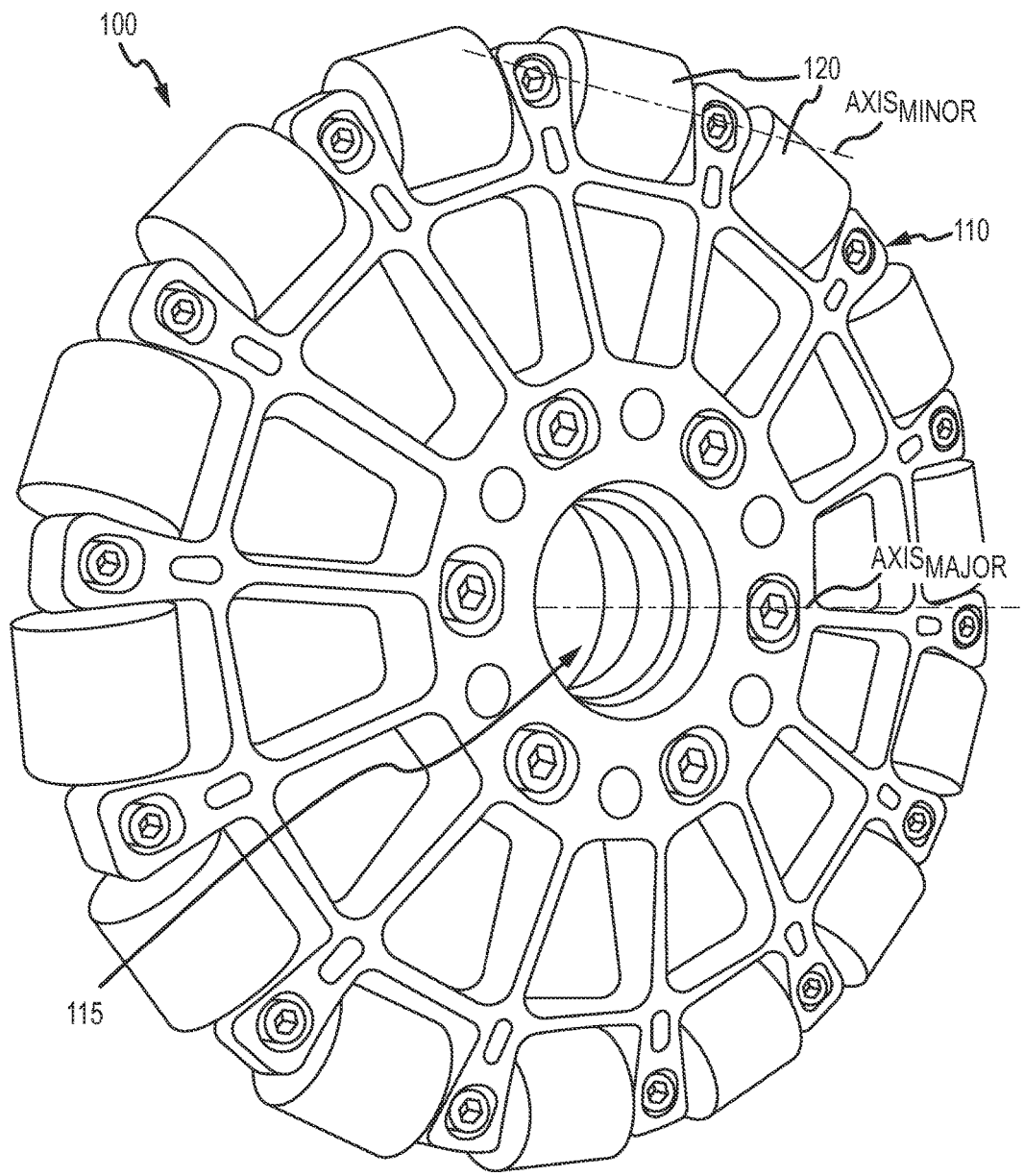
FIGS. 1-6 illustrate exemplary omniwheels available for use on omnidirectional vehicles or devices (e.g., robots) at the time of the inventors' design of the new omniwheels (and omnidirectional devices) described herein.
Figure 2:
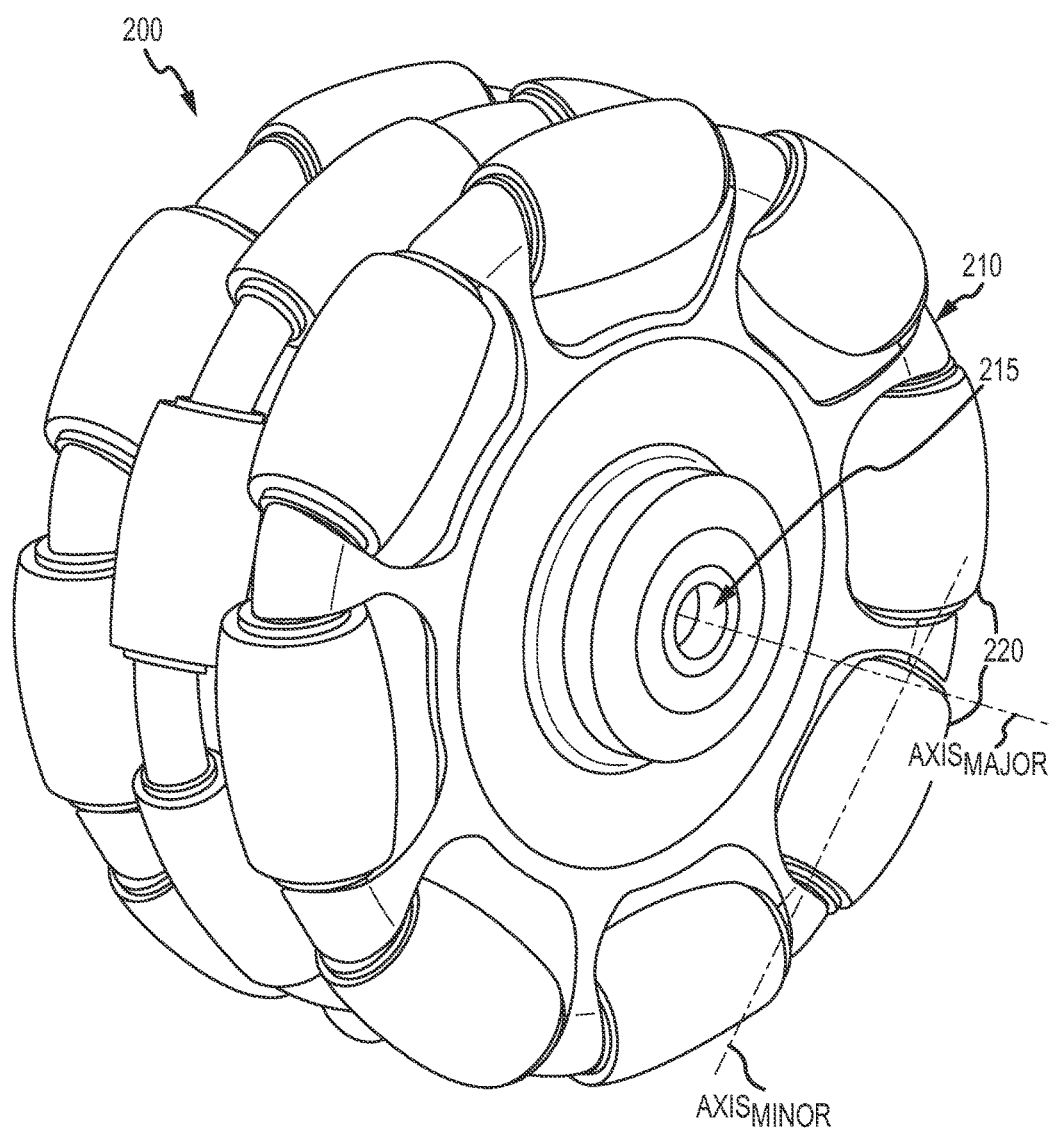
Figure 3:
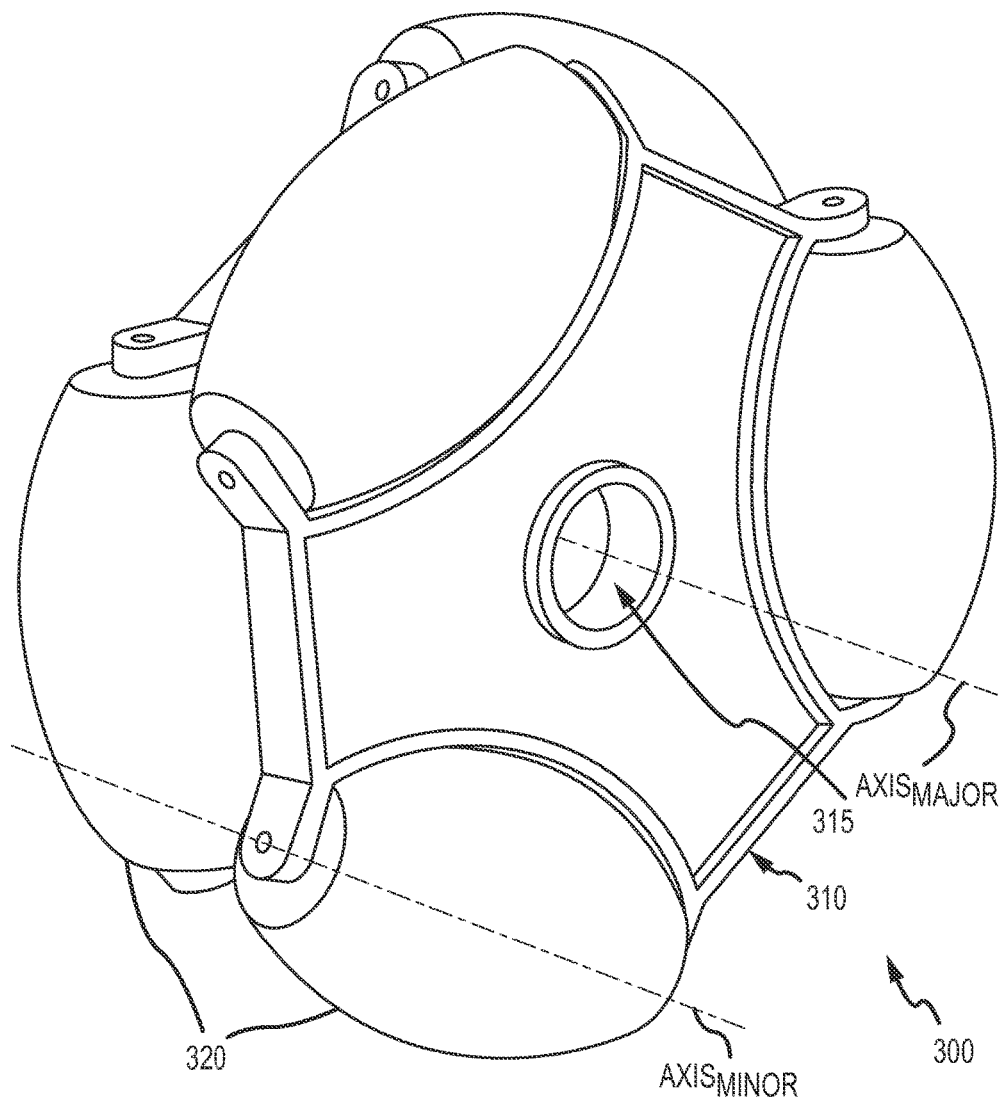
Figure 4:
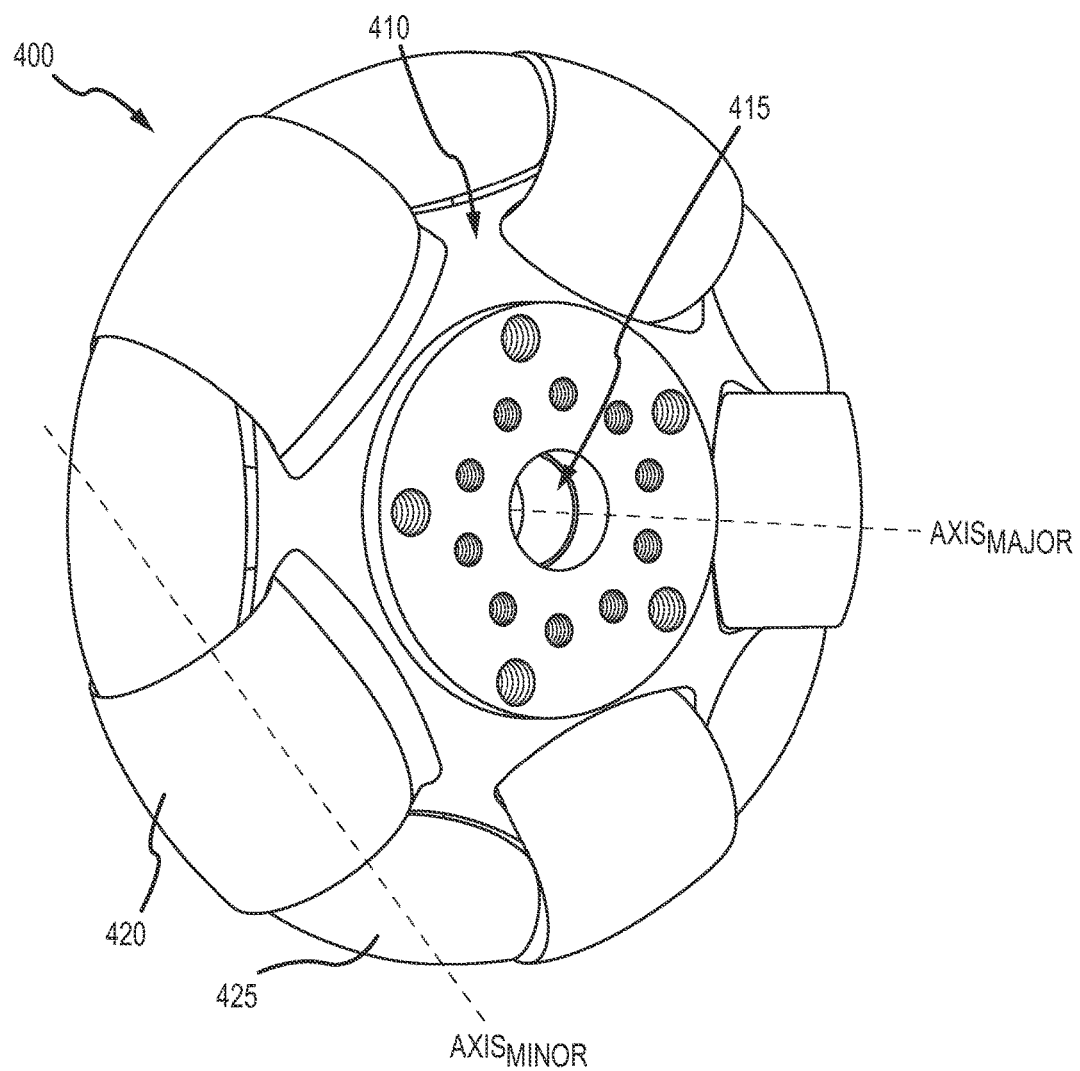
Figure 5A:
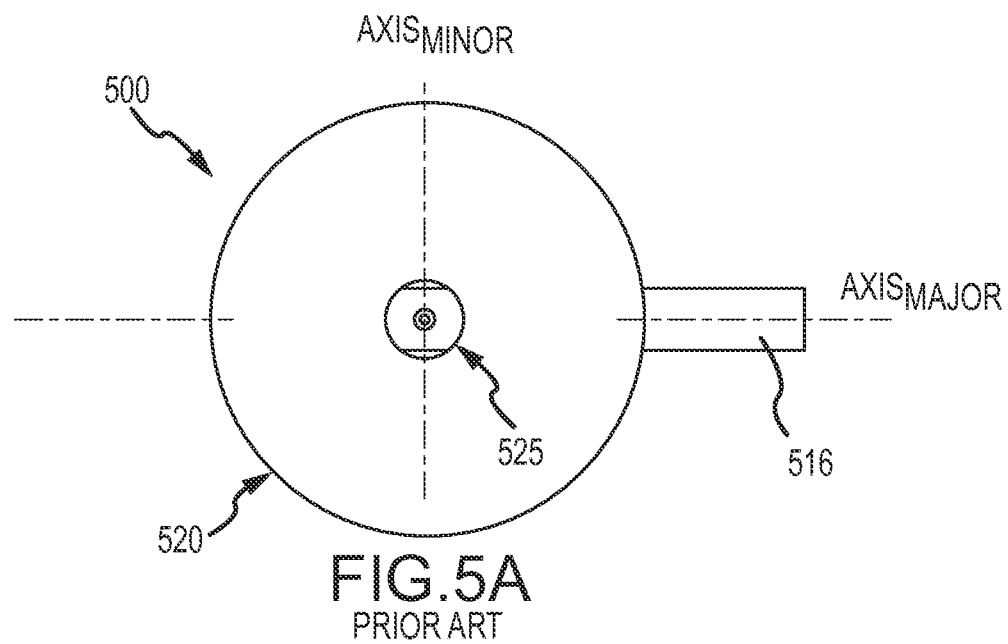
Figure 5B:
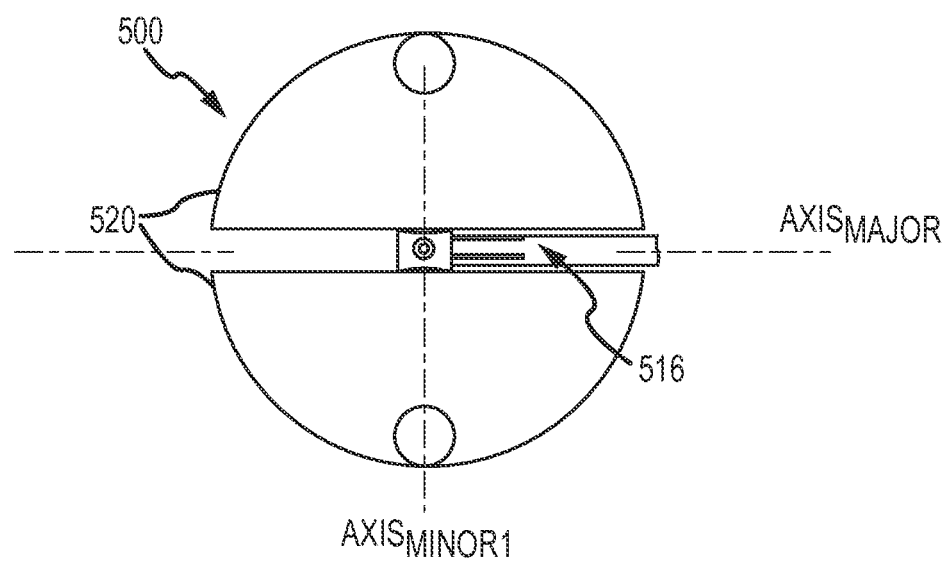
Figure 6:
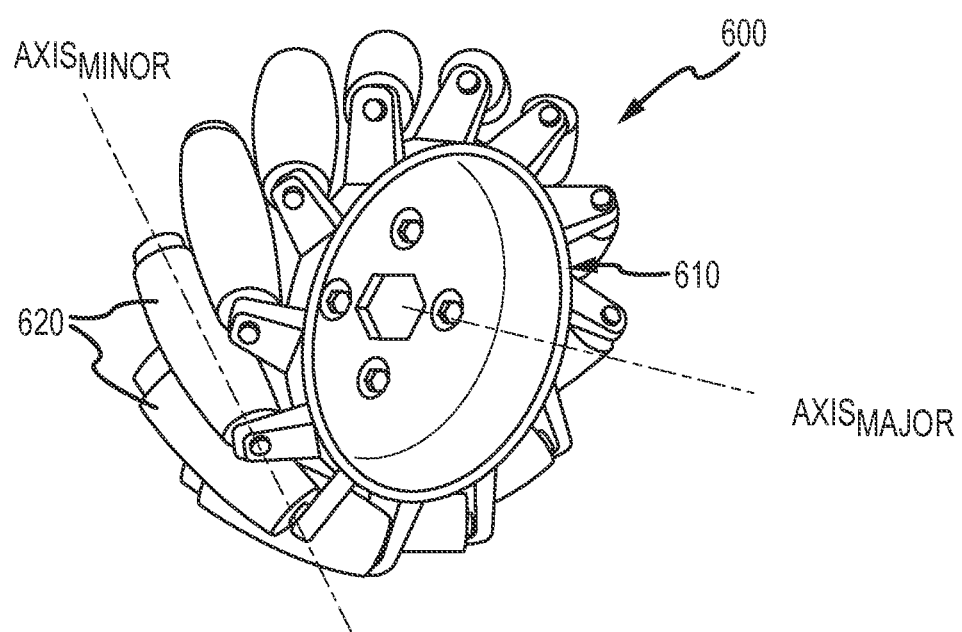
Figure 7:
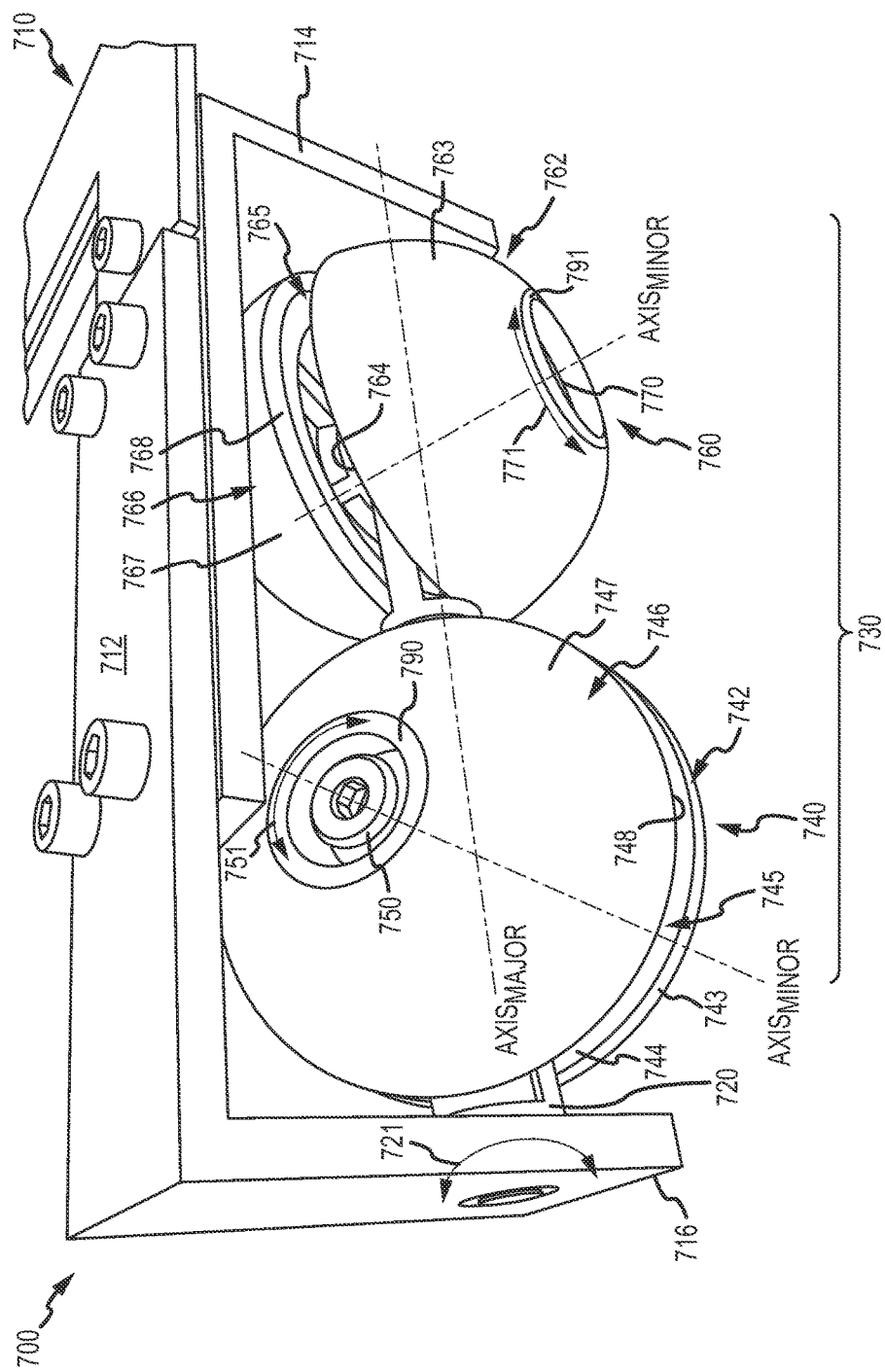
FIG. 7 is a top perspective view of a portion of an omnidirectional wheel assembly of the present description showing use of a pair of spherical rollers for each omniwheel of the assembly.

Significantly, the inventors achieve similar operations to this single spherical omniwheel through the use of two or more spherically shaped rollers in each omniwheel of an omnidirectional wheel assembly. FIG. 7 illustrates a portion of an exemplary omnidirectional wheel assembly 700. Specifically, FIG. 7 shows in detail one omniwheel 730 of the assembly 700, with the understanding that additional wheels having similar configurations would be included in the assembly 700 along with drive and control components. A typical assembly 700 may include three, four, or more of the wheels 730.

As shown, the omnidirectional wheel assembly 700 includes a wheel support frame 710 with support arm 712 for pivotally supporting each of the omniwheels 730, and the support arms 712 may extend outward from a central portion of the support frame 710. To support the omniwheel 730, a pair of shaft supports 714, 716 extend downward from the support arm 712, and the shaft supports 714, 716 are spaced apart a distance that is large enough to allow the omniwheel 730 to be received between the shaft supports 714, 716 (e.g., at least two times the outer diameter of the spherical rollers 740, 760).

A drive shaft or axle 720 is pivotally supported by the two shaft supports 714, 716 such that the shaft/axle 720 can rotate in either direction, e.g., when selectively driven by a drive motor or other wheel driver (not shown in FIG. 7), about its longitudinal axis, Major Axis, as shown with arrow 721. The omniwheel 730 is mounted upon the drive shaft/axle 720 so as to rotate with the drive shaft/axle 720 about the main or major axis, Major Axis, which causes the wheel assembly 700 to tend to move in a direction orthogonal (or at least transverse) to this axis, Major Axis. When the wheel assembly 700 is used in an omnidirectional device, the shaft 720 may be driven (e.g., motorized) or may be mounted for free rotation on a bearing(s) (e.g., non-motorized).

Significantly, the omniwheel 730 includes first and second rollers 740, 760 that are spherically shaped (or are "spherical rollers" or simply spheres) and are of matching size (i.e., have equal outer diameters). To provide mounting to the drive shaft 720, each of the rollers 740, 760 is split equally into first and second body portions 742, 746 and 762, 766, respectively, that are hemispherical in shape (or are the two hemispheres of the spheres 740, 760 formed, for example but not as a limitation, by cutting a sphere into two equal parts or halves). The outer surfaces 743, 747 and 763, 767 of the first and second body portions 742, 746 and 762, 766 of the two rollers 740, 760 provide the contact surfaces for the omniwheel 730 when the wheel assembly 700 is rolled over a surface. The inner surfaces 744, 748 and 764, 768 of the first and second body portions 742, 746 and 762, 766 of the two rollers 740, 760 face each other and are proximate to the drive shaft 720, with the central axes of the hemispheres of each roller 740, 760 being coaxial (correspond to first and second Minor Axes in FIG. 7).

Each hemisphere or body portion 742, 746, 762, 766 is supported upon the shaft 720 such that it can pivot or freely rotate about an axis (shown as First Minor Axis and Second Minor Axis in FIG. 7) that is orthogonal to the shaft 720 and bisecting the main axis, Major Axis. To this end, the roller 740 is shown to be mounted to the shaft 720 with a shaft, axle, or pin 750 that passes through the center of the first and second hemisphere-shaped body portions 742, 746. Each body portion 742, 746 is coupled to the pin 750 to be able to freely rotate about the pin 750 (or the hemispheres 742, 746 could be affixed to the pin 750, which could be free to rotate via its mounting to shaft 720), which is shown with arrow 751 and the longitudinal axis of the pin 750 defines a second rotation axis for the roller 740 or the First Minor Axis of rotation of the omniwheel 730. The two body portions 742, 746 may rotate 751 independently or may be linked together (such as via inner surfaces 744, 748) to rotate as a unit. Similarly, the roller 760 is mounted to the shaft 720 with a shaft, axle, or pin 770 that passes through the center of the first and second hemisphere-shaped body portions 762, 766. Each body portion 762, 766 is coupled to the pin 770 to be able to freely rotate about the pin 770 (or the pin 770 may be free to rotate about its coupling with the shaft 720), which is shown with arrow 771 and the longitudinal axis of the pin 770 defines a second rotation axis for the roller 760 or the Second Minor Axis of rotation of the omniwheel 730.

With the omniwheel 730 of FIG. 7, four hemispheres are used to form two neighboring or paired spheres (or spherically-shaped rollers). Each sphere or roller combines a pair of hemispheres allowing the rollers to rotate about a "minor" axis. A small spacing or gap 745, 765 between the hemispheres is provided along the equatorial plane to provide an access path for the support rod or shaft 720. Both pairs of hemispheres share the same support rod/drive shaft 720 such that they are rotated together or as a unit (e.g., as a single wheel 730).

Further, the hemispheres are arranged such that the minor axes of the two rollers 740, 760 are offset from each other by some offset angle, such as 60 to 90 degrees with 90 degrees shown in FIG. 7 for first and second Minor Axes. The support rod or drive shaft 720 can be placed inside bearings (e.g., as part of coupling the shaft 720 with the shaft supports 714, 716) to allow it to rotate 721 about its longitudinal axis (i.e., the Major Axis of the omniwheel 730 in FIG. 7). With the design of assembly 700, the omniwheel 730 has one major axis, Major Axis, and two minor axes, First and Second Minor Axes, all together spanning all three orthogonal directions.

When the double-sphere arrangement of the omniwheel 730 is placed on a surface, rotation 721 about the Major Axis (or longitudinal axis of the shaft/support rod 720) allows motion of the omniwheel 730 in a direction perpendicular to the Major Axis. This also rotates both of the sphere-shaped rollers 740, 760, and, hence, changes the direction of the Minor Axes. However, because the Minor Axes are arranged at an offset angle relative to each other (shown as an offset angle of 90 degrees in FIG. 7 but other angles may be used), one of the two Minor Axes is always partially parallel to the surface supporting the wheel assembly 700 and omniwheel 730. Spinning (as shown with arrows 751, 771) the two hemispheres/body portions 742, 746 and 762, 766 about the first and second Minor Axes allows motion of the omniwheel 730 in a direction that is parallel to the Major Axis. The combination of these motions allows the omniwheel 730 to provide motion in all directions.

The inventors further recognized that while one of the Minor Axes is parallel to the surface the other one of the Minor Axes may be facing the surface supporting the omniwheel 730 (e.g., this Minor Axis may be orthogonal to a plane passing through the surface). With this orientation of the rollers 740, 760, motion parallel to the Major Axis would cause the sphere or roller 740, 760 with its Minor Axis orthogonal to the surface to undesirably contact and drag along the surface (e.g., outer surface 743, 747, 763, or 767 would abut the surface upon which the wheel assembly 700 is traveling). To prevent (or minimize) this contact, the inventors determined that it would be desirable to remove a portion of the "poles" or "polar caps" of each of the rollers 740, 760. The removal of polar caps or poles is shown with regions 790 and 791 of the hemispheres or body portions 746 and 762 where the outer contact surfaces 747 and 763 are modified from being perfectly hemispherical in shape such as by removing material to form regions or subsurfaces 790, 791 (e.g., 0.1 to 0.5 inches or the like as measured from the original peak of the hemisphere to the planar region or subsurface 790 or 791 or by passing a plane through the hemisphere 746, 762 orthogonal to the Minor Axis and removing all material external to this plane). Similar subsurfaces or regions would be provided on hemispheres 742 and 766 opposite the subsurfaces 790 and 791.

By providing the subsurfaces (e.g., by removing the polar caps or poles) on each of the hemispheres of the two rollers 740, 760, there is no contact (or contact is disengaged) between that roller 740 or 760 when that roller's Minor Axis is orthogonal to the surface but contact is maintained between the omniwheel 730 and the surface via the other one of the rollers 740, 760. Hence, the rollers 740, 760 do not cause friction or hindrance to the motion of the omniwheel 730 on the surface regardless of the orientation of the rollers 740, 760 relative to the surface.

With this design (e.g., "flattened" poles of the hemispheres making up the sphere-shaped rollers), each sphere or roller pair in the wheel assembly 700 constitutes a single omniwheel. At any time, one of the rollers 740 or 760 may be out of contact with the surface while one of the rollers 740 or 760 remains in contact. Multiple pairs of rollers or multiple omniwheels are useful in an omnidirectional wheel assembly to ensure multiple contact points are provided on an ongoing basis and produce an omnidirectional wheel assembly with multiple omniwheels.

Figure 8:
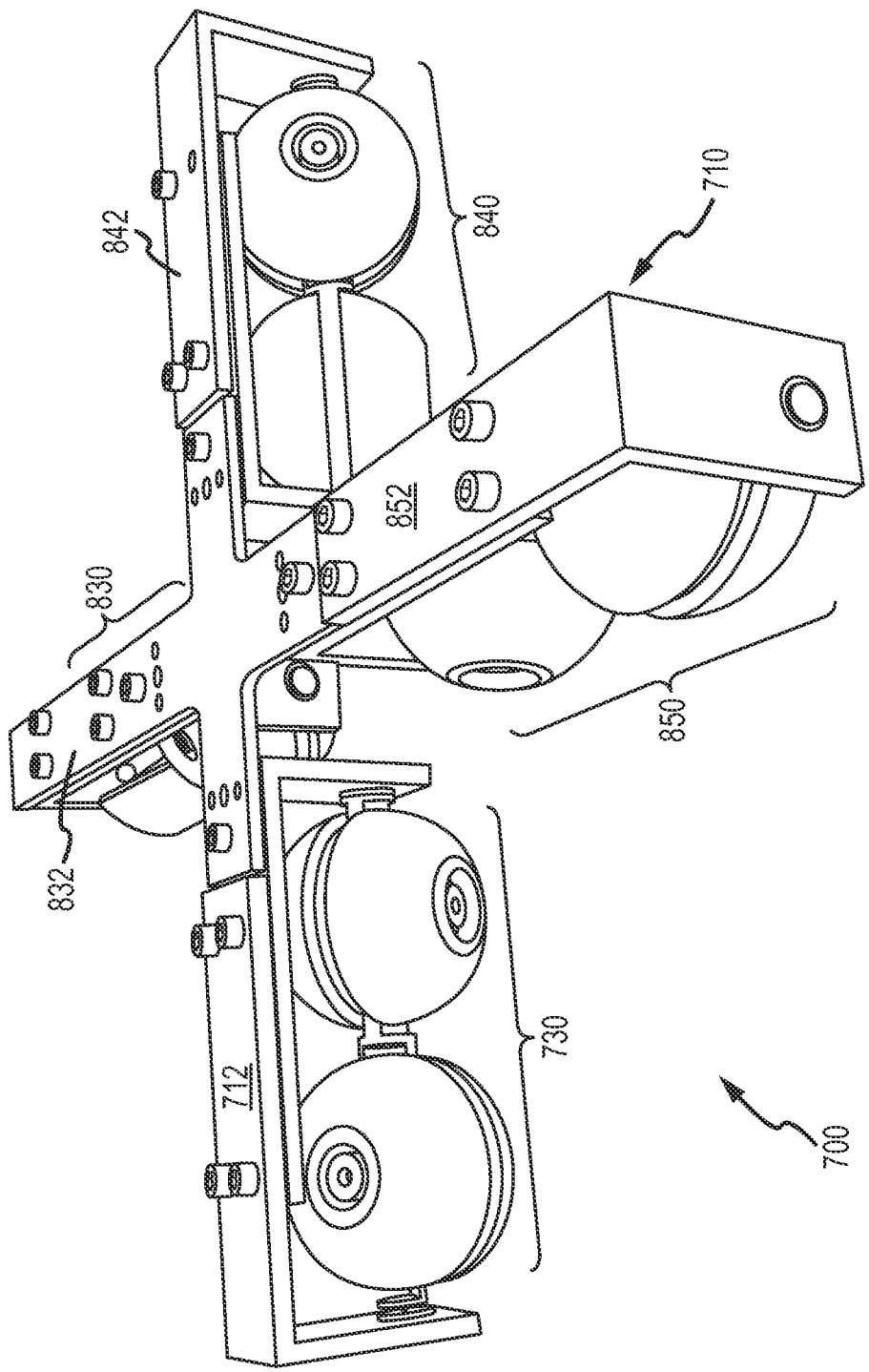
FIG. 8 is a top perspective view of the omnidirectional wheel assembly of FIG. 7 showing all four omniwheels of the assembly.

For example, FIG. 8 illustrates the omnidirectional wheel assembly 700 in fuller detail. As shown, the wheel assembly 700 includes the omniwheel 730 and also includes similarly configured omniwheels 830, 840, and 850 supported in the frame 710 by support arms 832, 842, and 852, respectfully. The wheel assembly 700 is shown to include four pairs of rollers (i.e., four omniwheels 730, 830, 840, and 850) or a total of eight sphere-shaped rollers, and the wheel assembly 700 may be used to support nearly any object or be used in a multi-wheeled vehicle. The wheel assembly 700 demonstrates a novel approach to omniwheels that has no smaller diameter rollers. As a result, the wheel assembly 700 can overcome obstacles or bumps on a surface much like a single sphere would but allowing for a feasible or practical-to-implement support structure and simple driving and control (e.g., by an electric motor selectively driving the shafts of omniwheels 730, 830, 840, and/or 850 concurrently or independently).

The omnidirectional wheel assembly 700 is shown to be configured for use on planar surfaces, which may be smooth or bumpy (have obstructions), and, to this end, the centers of each of spherical-shaped rollers is in a single plane. However, the inventors recognized that it may be desirable in some applications to provide a wheel assembly that is useful for non-planar surfaces such as to roll upon a body or object with a curved surface.

Figure 9:
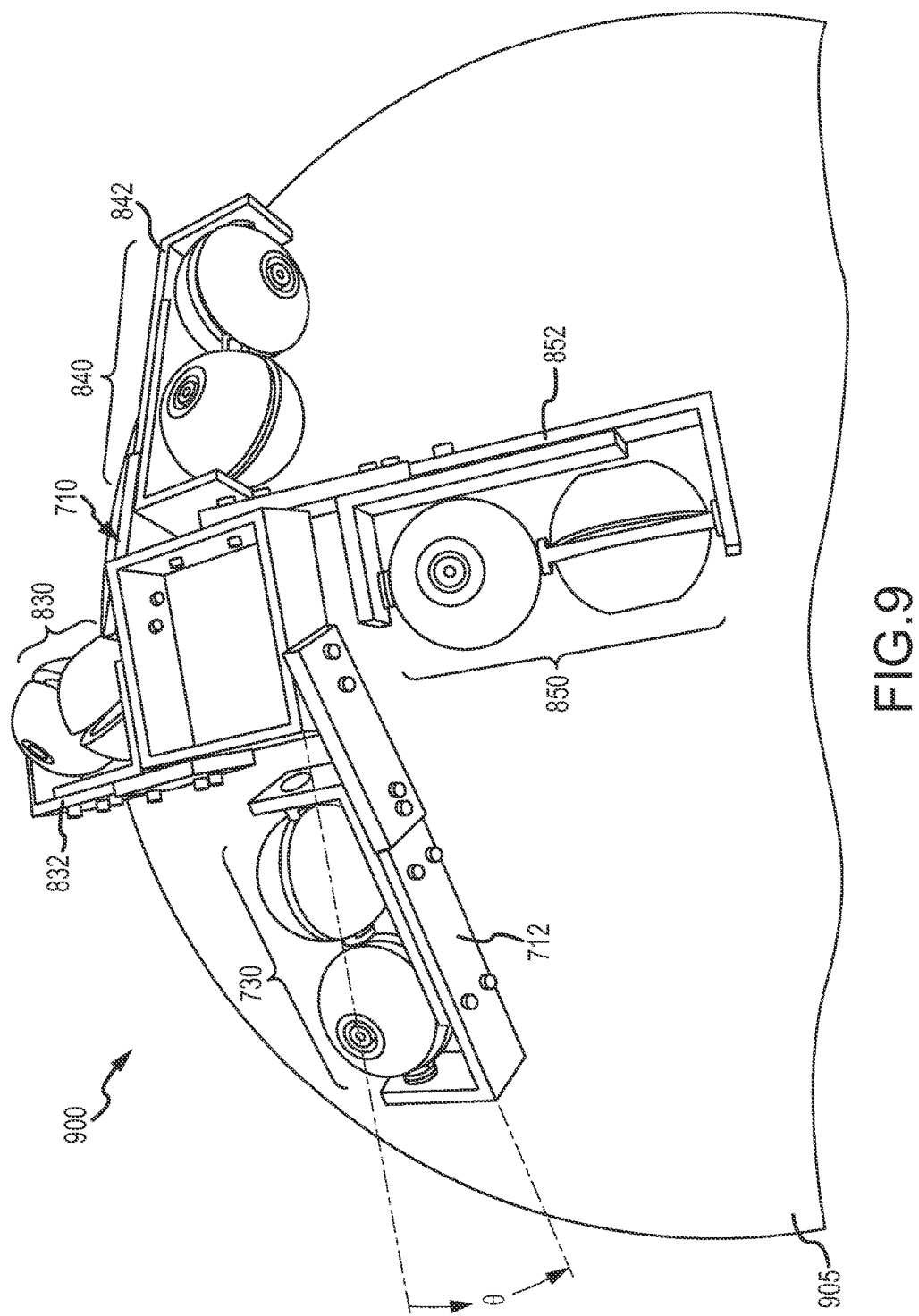
FIG. 9 is a top perspective view of an omnidirectional wheel assembly similar to those shown in FIGS. 7 and 8 but with the pairs of rollers arranged to non-coplanar (e.g., with the support arms for the omniwheels angled downward (or upward) rather than all being coplanar as in FIGS. 7 and 8)

With such applications in mind, FIG. 9 illustrates an omnidirectional wheel assembly 900 for rolling upon a curved surface 905. The wheel assembly 900 utilizes the components of assembly 700 but with a differing orientation of the four wheel support arms 712, 832, 842, and 852. Instead of having these arms (and the centers of the supported rollers) being coplanar, each of the arms 712, 832, 842, and 852 is angled downward from the center of the frame 710 to suit or match the radius of the surface 905 such as at an angle, θ, in the range of 5 to 45 degrees or the like. FIG. 9 also illustrates that the support arms 712, 832, 842, 852 may be provided to the sides of the rollers of the omniwheels 730, 830, 840, and 850. Also, FIG. 9 is useful for more clearly showing that in each pair of rollers the rollers are mounted to be offset from each other with a 90 degree offset being shown in FIG. 9.

As discussed above, an omnidirectional wheel assembly uses a pair (or more than two, in some cases) of rollers (or "spheres" or the like) to form a single omniwheel. Within each pair (or set when more than two rollers are used), only one of the rollers is generally making contact with a surface upon which the wheel assembly is supported (e.g., a floor that may be smooth or bumpy/rough with the new wheel design). The inventors recognized further that for a wheel assembly (or a vehicle or other omnidirectional device/system incorporating a wheel assembly of the present description) the arrangement of roller pairs (or sets) determines the area of support for the wheel assembly.

First, the inventors determined that while a three-wheeled wheel assembly may have some useful applications a 3-wheel (or 6-sphered) wheel assembly does not provide an area of support such that it may not be as desirable for use in a wheel assembly for an omnidirectional device in which objects (such as a vehicle body) is to be supported. In other words, the six spheres or rollers of the three omnidirectional wheels may be arranged in a hexagon about the center of support frame, but this arrangement has no guaranteed area of support.

Second, though, the inventors recognized that the use of four or more omnidirectional wheels (8 or more rollers or spheres) is desirable for wheel assemblies for use in omnidirectional devices used to support objects. Specifically, a 4-wheeled (or 8-roller) wheel assembly (which may be used in an omnidirectional device such as a vehicle) can be configured to provide a square or diamond-shaped support area. The rollers in each omniwheel may be configured in any of the ways taught herein (e.g., with polar caps removed and offset relative to each other at an offset angle) to provide a useful wheel assembly.

With this in mind, FIG. 10 schematically illustrates a 4-legged wheel assembly 1000 that may be used in a vehicle or other omnidirectional device to support an object (e.g., a vehicle body) on a platform 1010. In this example, the platform 1010 may be part of the support frame for the four legs or omniwheels 1020, 1030, 1040, and 1050, and the platform 1010 is shown to be of the same shape and size as the guaranteed area of support provided by the wheel assembly 1000. In other cases, the platform 1010 may have a different shape and/or may be smaller than the diamond-shaped area of support provided by the wheel assembly 1000.

The first omniwheel 1020 includes first and second rollers 1022, 1024 supported by support rod or shaft 1026 (shown schematically as it would be hidden from view in practice by at least one of the rollers 1022 or 1024 in the view of FIG. 10), and the mounting of the rod/shaft 1026 to the support frame 1010 may be performed in any of a number of well-known ways (including those shown in FIGS. 7-9). The second omniwheel 1030 is offset from the first omniwheel 1020 by 90 degrees (as measured between longitudinal axes of the support rods/shafts 1026, 1036), and, as with the first omniwheel 1020, the wheel 1030 includes first and second rollers or spheres 1032, 1034 that are both supported (and, in some cases, driven) by shaft or rod 1036, which is supported by or from the support platform 1010. The third omniwheel 1040 is offset by 90 degrees from the second omniwheel 1030 and includes a pair of rollers/spheres 1042, 1044 supported by rod or shaft 1046. Finally, the fourth omniwheel 1050 is offset from the third omniwheel 1040 (and the first omniwheel 1020) by 90 degrees, and it includes a pair of rollers/spheres 1052, 1054 supported by rod/shaft 1056. Hence, the four legs of the wheel assembly 1000 form an orthogonal cross pattern as shown in FIG. 10.

FIG. 11 schematically illustrates an omnidirectional wheel assembly 1100 that may be used in an omnidirectional device. The wheel assembly 1100 includes a wheel support frame 1110 that includes outer frame members 1112 arranged in a rectangular shape. Further, the frame 1110 includes a support platform 1116 that is diamond shaped and sized to match the guaranteed area of support provided by the wheel assembly 1100. Again, in practice, the support frame 1116 may have a different shape and/or smaller size than this support area. The rollers of the four omniwheels 1120, 1130, 1140, and 1150 are arranged in an octagonal pattern about the center of the support frame 1110 to provide the guaranteed support area useful for providing the support platform 1116.

To this end, the four omniwheels 1120, 1130, 1140, 1150 are each made up of two rollers (i.e., rollers pairs 1122 and 1124, 1132 and 1134, 1142 and 1144, and 1152 and 1154) that are each supported by a rod or shaft (and may be driven by rotation of this shaft or be allowed to freely rotate in non-motorized implementations of the wheel assembly 1100) 1126, 1136, 1146, and 1156. The support shafts/rods 1126, 1136, 1146, 1156 are each oriented relative to the outer frame members 1112 and/or support frame 1110 to align with or correspond with four spaced-apart or alternating sides of an octagon. In this manner, the octagon configuration of the wheel assembly 1100 provides a diamond-shaped guaranteed area of support where an object such as support platform 1116 may be positioned for support by the four omniwheels 1120, 1130, 1140, and 1150. The size of the support area will be proportional to the size of the octagon defined by the omniwheels 1120, 1130, 1140, and 1150 or their main rotation axes (e.g., drive or rotation shafts 1126, 1136, 1146, and 1156).

When designing and fabricating pairs of rollers for an omnidirectional wheel as shown in FIGS. 7-11, it is useful to trim as much as possible of the polar cap or pole of each hemispherically-shaped body portion of the rollers. This "trimming" away of material or creating flat spots on the otherwise spherical roller gives the omniwheel clearance with bumps or obstacles on a surface. However, it is also desirable to retain a small overlap of the two offset rollers so as to ensure there is always a contact surface available for the omniwheel formed with the two trimmed rollers.

Figure 12A:
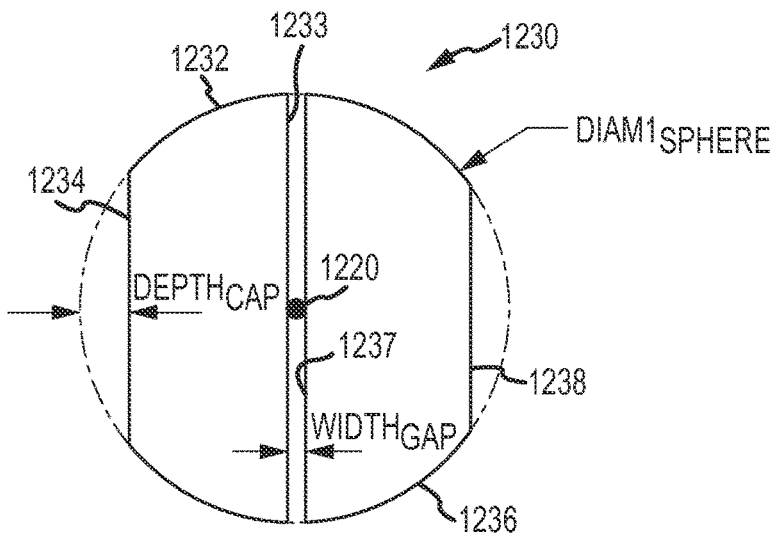
FIGS. 12A-12E illustrate views of omniwheel embodiments and components showing use of a combination of trimming or removal of polar caps or poles and angularly offset pairs of rollers to provide clearance from obstacles in a dual-sphere omniwheel.
Figure 12B:
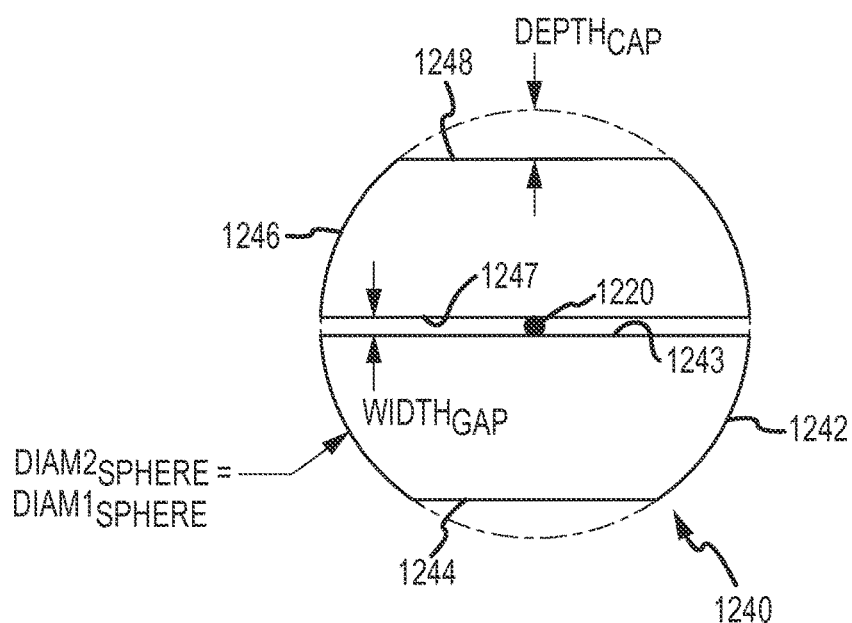
Figure 12C:
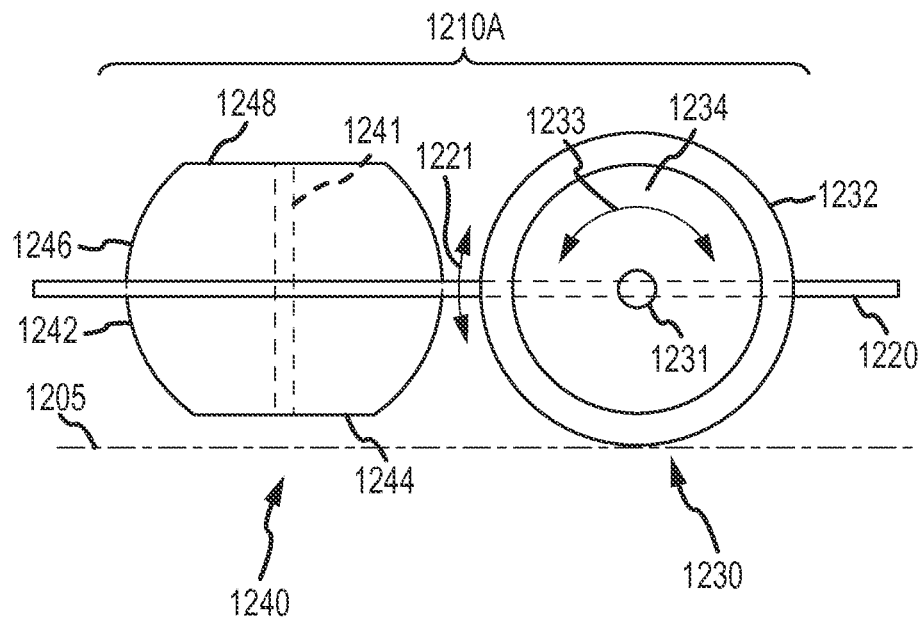
Figure 12D:
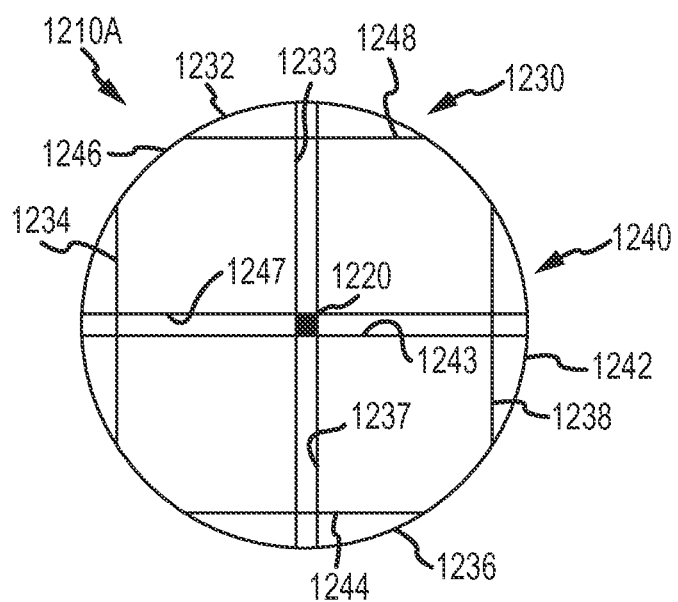

FIGS. 12A-12D describe the design of an omniwheel 1210A in which two rollers 1230 and 1240 are supported upon a rod or shaft (e.g., a drive shaft in motorized versions or support shaft/axle in non-motorized versions) 1220, which defines the main rotation axis for the omniwheel 1210A. As shown in FIGS. 12C and 12D, the two rollers 1230, 1240 are offset at an offset angle of 90 degree relative to each other on the shaft 1220, and FIG. 12C illustrates that in most cases only one of the rollers 1230 or 1240 is contacting a surface 1205 on which the omniwheel 1210A is supported. At this point in operation (e.g., of wheel assembly with wheel 1210A), the roller 1230 is touching the surface 1205 and its hemispherically-shaped body portions are rotating about a minor axis of the omniwheel 1210A as defined by support pin 1231. Roller 1240 is not touching the surface 1205. When the shaft 1220 is rotated further, the two rollers 1230, 1240 will also rotate about the main axis of the omniwheel 1210A causing the roller 1240 to become the touching or contacting roller of the pair (and causing its hemispherically-shaped body portions to rotate about another minor axis of the omniwheel 1210A as define by support pin 1241) and causing roller 1230 to become the not touching or spaced apart roller of the pair.

The amount of clearance provided in the omniwheel 1210A (e.g., space between roller 1240 and the surface 1205) is defined by the amount of trimming of the polar caps or poles of the rollers 1230, 1240. Typically, it is useful to trim a relatively large amount to provide more clearance and allow the omniwheel 1210A to overcome larger obstacles or bumps. In general, it is believed that it is desirable to trim less than about 30 percent (e.g., 20 to 29 percent or the like) from the outer diameter of the spherically-shaped roller. FIG. 12A shows that roller 1230 is formed of first and second body portions 1232, 1236 that are hemispheres of a larger sphere with an outer diameter, $Diam1_{Sphere}$. The two body portions 1232, 1236 are spaced apart a small distance, $Width_{Gap}$, with planar, inner surfaces 1233, 1237 facing each other, to provide a passageway or access path for the main shaft 1220 to allow it to support the roller 1230 in the omniwheel 1210A, and this distance or gap size, $Width_{Gap}$, is preferably kept as small as possible (e.g., about the outer diameter of the main shaft 1220 or the like).

Further, dashed lines are shown to illustrate that the opposite polar caps or poles have been removed or at least trimmed to form recessed outer surfaces 1234, 1238. In sectional or side view (as shown), these surfaces 1234, 1238 are defined by a chord of a circle with the diameter, $Diam1_{Sphere}$, of the roller 1230, but, in practice, the surfaces 1234, 1238 planar with a circular outer boundary (see roller 1230 in FIG. 12C and its surface 1234) that would be formed by passing a plane through each hemispherically-shaped body portion 1232, 1236. The location of the surfaces 1234, 1238 may be defined by a depth of material removed, $Depth_{Cap}$, as measured between the surface 1234, 1238 and the outer diameter, $Diam1_{Sphere}$, of the roller 1230. As discussed above, the overall removal of material or trimming of polar caps or poles is typically limited to less than about 30 percent of the roller diameter, $Diam1_{Sphere}$, such that the depth, $Depth_{Cap}$, of the surfaces 1234, 1238 may be less than about 15 percent of the roller diameter, $Diam1_{Sphere}$, and will vary with the size of the rollers used for a particular wheel assembly.

Likewise, as shown in FIG. 12B, the other or second roller 1240 is formed of two spaced-apart, hemispherically-shaped body portions 1242, 1246 with their inner, planar surfaces 1243, 1247 spaced apart the distance, $Width_{Gap}$. The roller 1240 has an outer diameter, $Diam2_{Sphere}$, that matches that of the first roller 1230. Also, the amount of the polar cap or pole removed from each of the body portions 1242, 1246 matches that removed from the roller 1230, e.g., each roller 1230, 1240 has the same depth, $Depth_{Cap}$, of its recessed outer surfaces 1234, 1238 and 1244, 1248. FIG. 12D is a schematic end view of the omniwheel 1210A shown in FIG. 12C showing all contact surfaces and showing the recessed surfaces 1234, 1238, 1244, 1248. FIG. 12D is useful for showing that overlap is provided even with the removal of the polar caps so that with a 90-degree offset of the rollers 1230, 1240 in the omniwheel 1210A at least a portion of one of the rollers 1230, 1240 will be in contact with the surface 1205 while providing enhanced clearance for overcoming obstacles.

The inventors recognized that the 90-degree offset of the rollers such as in omniwheel 1210A of FIGS. 12A-12D can be further improved. For example, the spacing in each roller 1230, 1240 between the two hemispheres or body portions 1232, 1236 and 1242, 1246 provides a gap and also a "flat spot" of a particular size, $Width_{Gap}$. This can reduce the smoothness of the contact provided by the omniwheel 1210A or cause other issues. Hence, trimming less of the polar cap or poles may be desirable in some applications, e.g., reduce $Depth_{Cap}$ to 5 to 10 percent rather than a maximum of 14.5 percent of the roller outer diameter. However, this results in reduced clearance, which may not be desirable for all applications such as applications with larger obstacles to overcome on a surface.

Figure 12E:
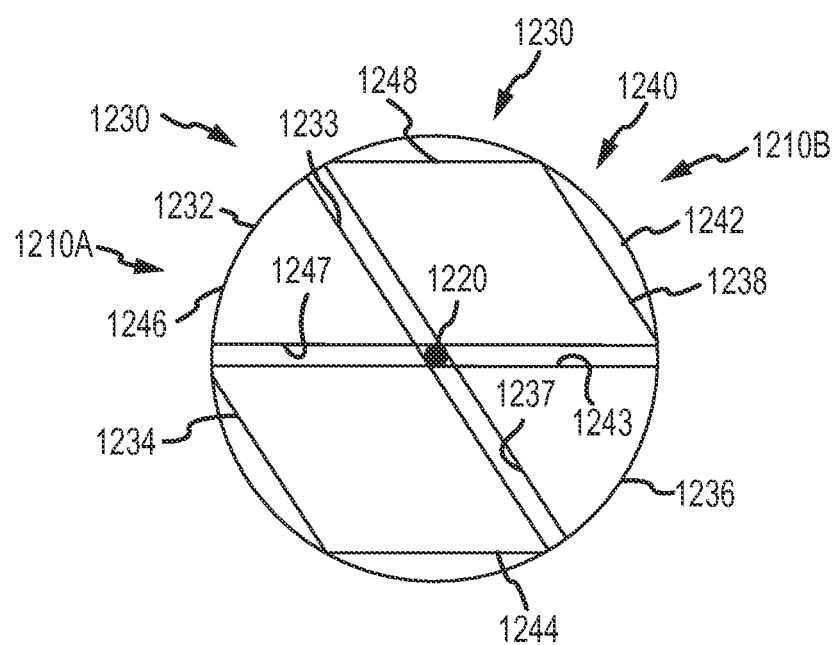

With this in mind, FIG. 12E illustrates an end view similar to FIG. 12D of another useful omniwheel 1210B adapted to overcome the gap-producing flat spot in the roller pairs. As shown, the minor axes of the two rollers 1230, 1240 has been reduced from 90 degrees to an angle of about 45 to 60 degrees. An offset of about 60 degrees between the rollers 1230, 1240 and a similar depth, $Depth_{Cap}$, of polar cap removal as in omniwheel 1210A, the omniwheel 1210B is configured to provide coverage (e.g., continuous contact surfaces for smooth rolling on a surface) for both the polar cap (recessed outer surfaces 1234, 1238, 1244, 1248) and the flat spot. In other words, the outer contact surfaces (or curves) of the other roller 1230 or 1240 covers the polar cap and flat spot of the other roller 1230 or 1240. Hence, a pair of rollers may be arranged at an offset angle between 45 and 90 degrees according to the present description to achieve a range of contact "smoothness" and clearance for overcoming differing sizes of obstacles or bumps.

The above examples of omniwheels for omnidirectional wheel assemblies have used pairs of spherically-shaped rollers. In some cases, it may be useful to include three or more rollers to achieve a desired functional goal. For example, it may be desirable to design an omniwheel with greater clearance than provided by the limitations of a two-roller design (e.g., less than about 29 percent of outer diameter total material removal from poles). To this end, FIGS. 13A-13D illustrate schematically a tri-sphere/roller omniwheel 1310. Instead of the 90 degree offset of some dual-sphere designs, the omniwheel 1310 includes three spherically-shaped rollers 1330, 1340, and 1350 offset from adjacent rollers by 60 degrees. As shown in FIG. 13C, the three rollers 1330, 1340, and 1350 are attached to the shaft or rod 1320, which defines the main axis of rotation for the omniwheel 1310.

Figure 13A:
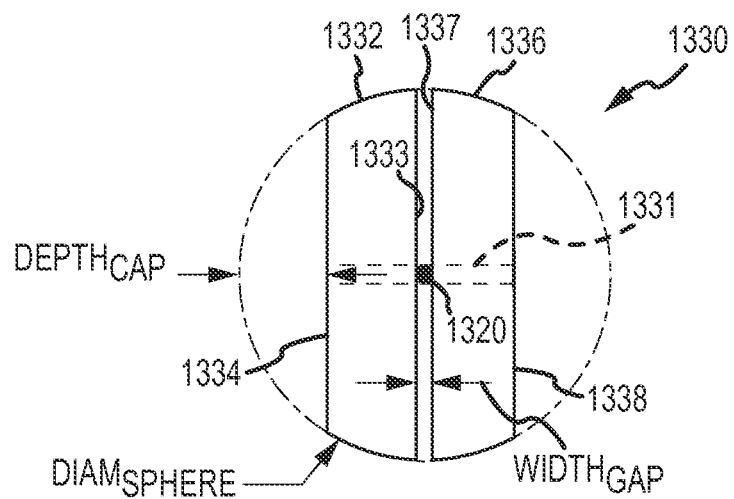
FIGS. 13A-13D illustrate views of a tri-sphere/roller omniwheel and its components adapted to provide larger clearances than some dual-sphere designs.

FIG. 13A shows one of the rollers 1330 in more detail. As can be seen, the roller 1330 includes two semi-hemispherical body portions 1332, 1336 with their planar inner surface 1333 and 1337 spaced apart a small distance, $Width_{Gap}$, that provides a passageway for insertion of the main shaft 1320 between the body portions 1332, 1336 (which are affixed to the shaft 1320). Each body portion 1332, 1336 is also free to rotate about a minor axis of the omniwheel 1310 via pivot mounting on a smaller pin or axle as shown with element 1331 in roller 1330. The depth, $Depth_{Cap}$, to the recessed outer surfaces 1334 and 1338 on the body portions or semi-hemispheres 1332, 1336 can be greater than that used for omniwheels 1210A and 1210B due to the use of three rollers 1330, 1340, and 1350 to provide coverage or contact surfaces for the omniwheel 1310. For example, the amount of polar cap or poles removed may be in the range of 30 to 50 percent of the roller diameter, $Diam_{Sphere}$, or, more generally, less than about 50 percent of this value.

Figure 13B:
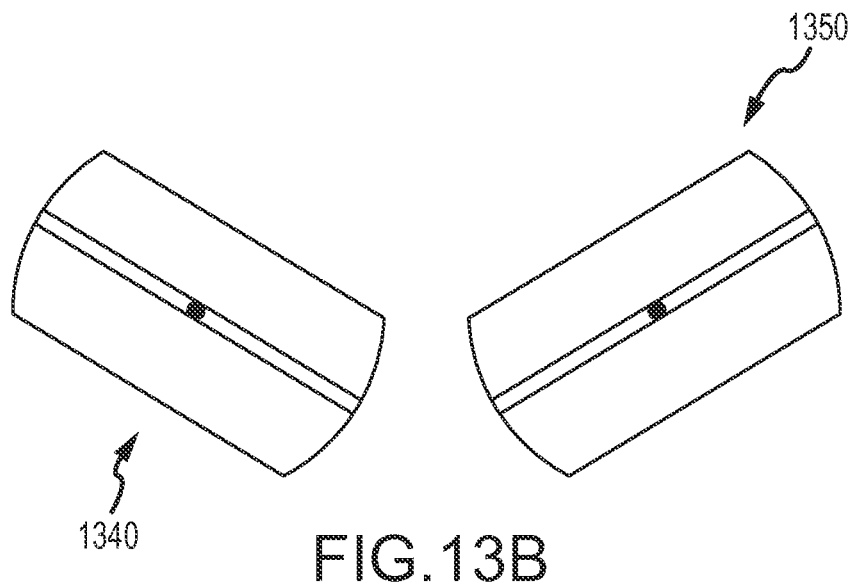
Figure 13C:
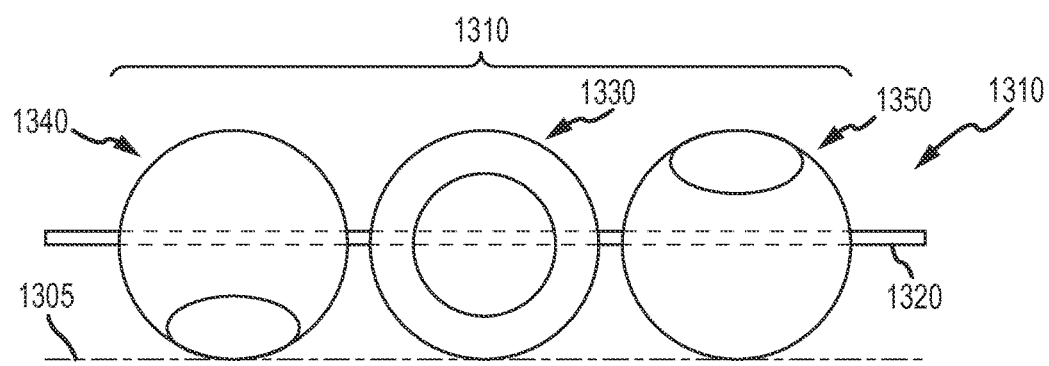
Figure 13D:
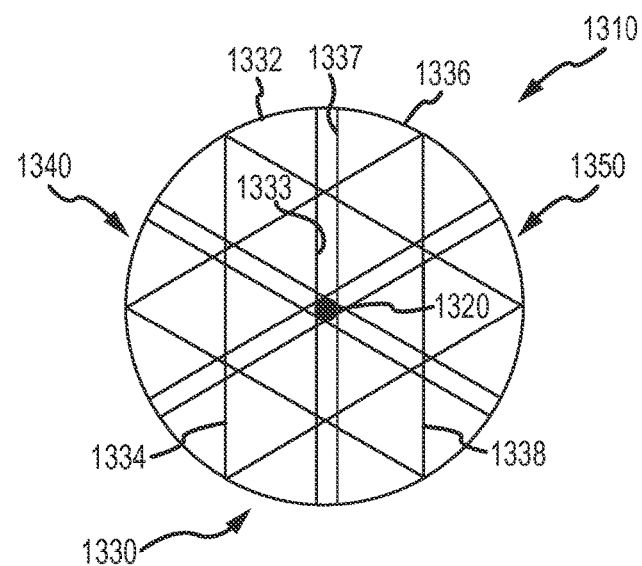

FIG. 13B illustrates that relative to the roller 1330 the other two rollers 1340, 1350 are rotated on the main shaft 1320 an offset angle of 60 degrees (or an offset of 50 to 70 degrees in some omniwheel implementations). The use of a 60-degree offset angle between adjacent pairs of the rollers 1340, 1330, and 1350 can be seen in FIGS. 13C and 13D in the omniwheel 1310, with FIG. 13D providing an end view that schematically shows that the continuous contact surface is provided by the combination of the curved outer surfaces of the semi-hemispherical body portions of the three rollers 1330, 1340, and 1350.

Figure 14A:
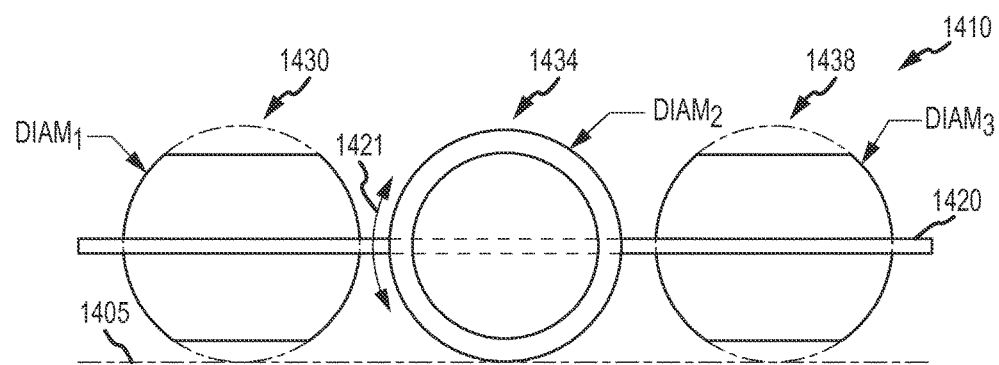
FIGS. 14A and 14B illustrate side views of two additional tri-sphere/roller omniwheels configured for use on planar and curved surfaces, respectfully.
Figure 14B:
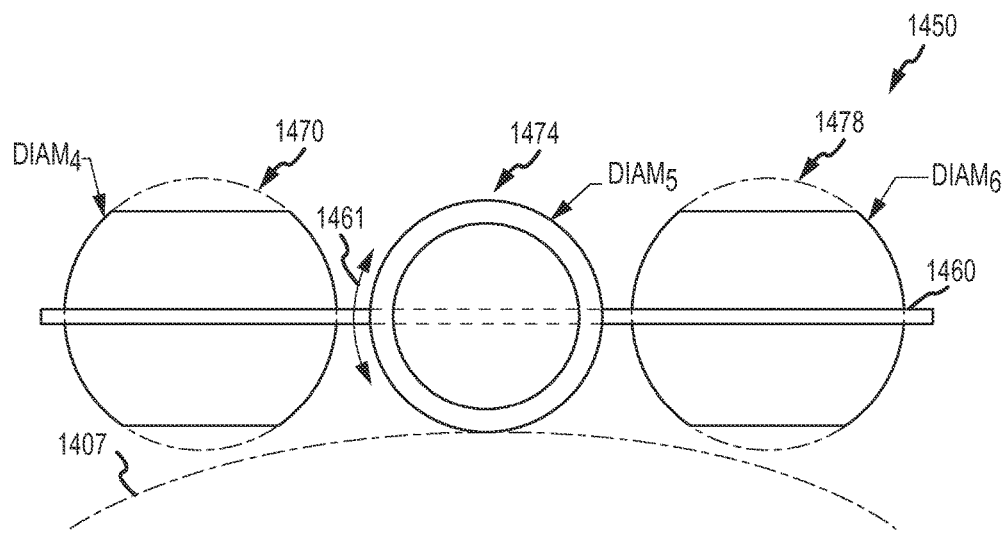

FIGS. 14A and 14B illustrate additional examples of tri-sphere (or roller) embodiments of omniwheels 1410 and 1450 that are specifically designed for use with a planar surface 1405 and for a curved surface 1407 (which may both be bumpy or have bumps and/or other obstacles to overcome). In each of the omniwheels 1410, 1450, the three spheres or rollers are offset from adjacent spheres or rollers by 90 degrees, but the spheres or rollers are sized or chosen to retain an effective point of contact centered or non-moving. This can significantly help with the issue of a small area of support in wheel assemblies incorporating the omniwheels 1410, 1450.

In omniwheel 1410, the three rollers 1430, 1434, 1438 are mounted and supported upon the main shaft 1420, which defines the major rotation axis about which the omniwheel 1410 rotates as shown with arrow 1421. The two outer spheres or rollers 1430, 1438 have the same orientation and, in this example, are rotated an offset angle of 90 degrees on the shaft 1420 relative to the center or inner sphere or roller 1434. In this way on a flat or planar surface 1405, either both of the outer rollers 1430 and 1438 are in contact or, as shown, the center roller 1434 is in contact with the surface 1405. As a result, the effective contact point remains constant for the omniwheel 1410. The omniwheel 1410 is configured for use on planar or flat surfaces such as surface 1405, and, to this end, all the rollers are of the same size, i.e., have the same outer diameters ($Diam_1 = Diam_2 = Diam_3$).

In omniwheel 1450, the three rollers 1470, 1474, 1478 are mounted and supported upon the main shaft 1460, which defines the major rotation axis about which the omniwheel 1450 rotates as shown with arrow 1461. The two outer spheres or rollers 1470, 1478 also have the same orientation and, in this example, are rotated an offset angle of 90 degrees on the shaft 1460 relative to the center or inner sphere or roller 1474. In this way on the curved surface 1405, either both of the outer rollers 1470 and 1478 are in contact or, as shown, the center roller 1474 is in contact with the surface 1407. As a result, the effective contact point remains constant for the omniwheel 1450. In contrast, though, to omniwheel 1410, the omniwheel 1450 is configured for use on curved surfaces such as surface 1407, and, to this end, the outer rollers 1470 and 1478 are of equal size but are greater than the size of the center roller 1474, i.e., $Diam_4 = Diam_6 > Diam_5$. The specific size of the rollers 1470, 1474, 1478 should be chosen to suit particular amount of curve or radius of the curved surface 1407.

In some omniwheel assemblies, scrubbing may occur in pairs or sets of rollers of an omniwheel. For example, the above description showed several omniwheels with a pair of rollers mounted on a single rotation or drive shaft such that the major axis of the omniwheel passed through the centers of both rollers. This configuration may be thought of as an omniwheel with "inline" rollers (see, for example, omniwheel 730 in FIG. 7). Scrubbing can occur with such an in-line omniwheel because as the main shaft is rotated there are times when both rollers are touching or in contact with the surface. At these times, because the rollers share the same main shaft, their respective contact point velocities that are perpendicular to the shaft must match each other. However, when both (or two or more) rollers of an omniwheel are in contact with a surface upon which an omniwheel assembly is rolling or moving and the omniwheel assembly rotates or is rotated on the surface, the contact point velocities perpendicular to the main shaft differ. As a result, at least one of the rollers can (at least temporarily) drag or scrub on the surface supporting the wheel assembly.

The inventors recognized that scrubbing can be avoided (or at least reduced) by providing an omniwheel design in which rotation of the omniwheel assembly never projects differently onto the drive shaft or axle at the roller locations. This can be achieved by arranging the rollers of an omniwheel side-by-side on two shafts or support rods rather than inline on a single or main shaft. The two main shafts (or shafts/axles/rods defining the two major rotation axes) for each omniwheel of a wheel assembly should be coupled 1:1 so that, as with the inline embodiments described herein, one roller of each omniwheel is in contact when the other (or others) of the pair (or set) are out of contact with a particular surface. This configuration is mathematically provable to be "scrub-free." The 1:1 coupling of the two rotation shafts can be achieved in a variety of ways such as with a belt, with gears, or other mechanical coupling as is well known to those skilled in the arts.

Figure 15:
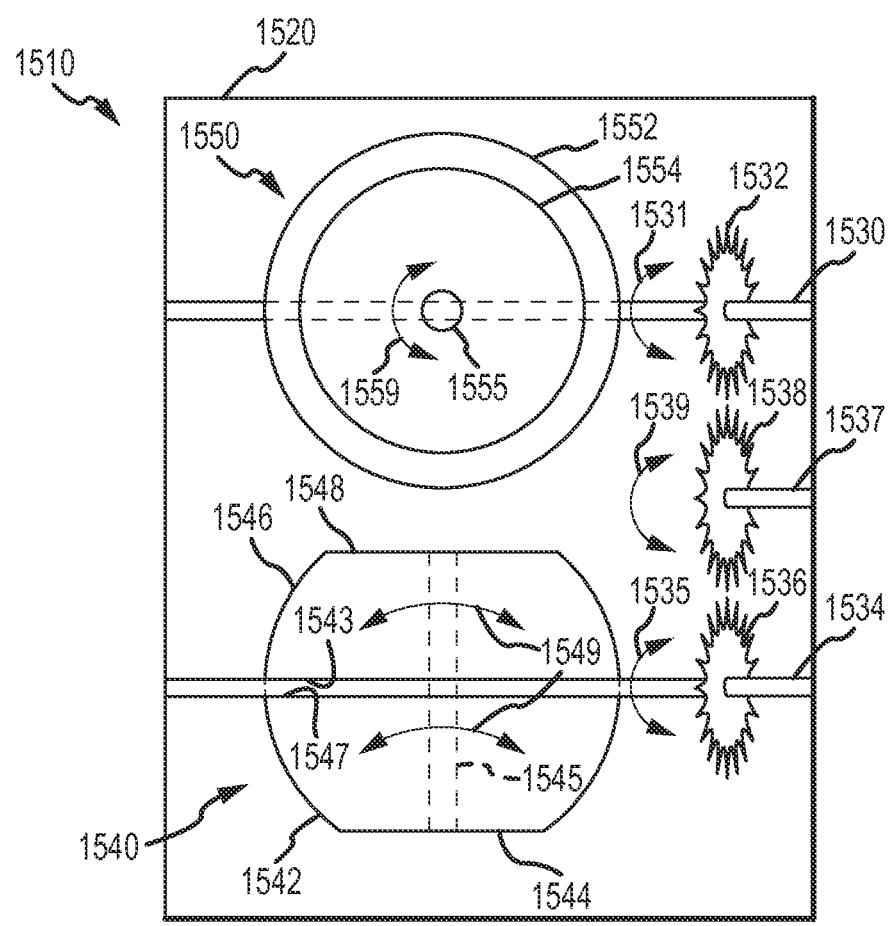
FIG. 15 illustrates a schematic of a side-by-side, dual-roller omniwheel configured to provide smooth contact surfaces that can be used on bumpy surfaces and that controls scrubbing of the rollers.

FIG. 15 illustrates schematically a side-by-side omniwheel 1510 that may be used in place of the inline versions described earlier in an omnidirectional wheel assembly. As shown, the omniwheel 1510 includes a wheel enclosure or support 1520 that may take the form of four walls or rods/beams as shown. The omniwheel 1510 also includes a pair of (or first and second) main shafts or support rods 1530, 1534 rather than a single shaft, and the shafts are pivotally supported by the wheel enclosure 1520 (e.g., with bearing or the like at each end not shown). The shafts 1530, 1534 are coupled 1:1 in this example with a coupling shaft 1537, also supported by the wheel enclosure 1520 and disposed between the shafts 1530, 1534, and gears 1532, 1536, and 1538 affixed, respectfully, to shafts 1530, 1534, and 1537. In a non-motorized version of omniwheel 1510, each of the shafts 1530, 1534, 1537 may be free to rotate about as shown with arrows 1531, 1535, and 1539. In a motorized version, one of the shafts 1530, 1534, or 1537 may be driven by a motor (e.g., the shaft 1537 may be considered the drive and coupling shaft for omniwheel 1510 and be selectively driven to rotate 1531, 1535 the shafts 1530, 1534 about the two major rotation axes of the omniwheel 1510).

The omniwheel 1510 further includes a pair of spherically-shaped rollers 1540, 1550, which are oriented on the shafts 1530, 1534 to be at a 90 degree offset relative to each other (as may be measured as the angle between their two minor rotation axis corresponding with longitudinal axes of the support pins/axles 1545, 1555 about which the semi-hemispheres of each roller 1540, 1550 rotates as shown with arrows 1549 and 1559). The roller 1540 is shown in greater detail in FIG. 15 but roller 1550 would have an identical makeup of components, size, and shape. The roller 1540 includes first and second body portions 1542, 1546 that are hemispheres of a larger sphere that are spaced apart a gap for receiving the shaft 1534 and with inner, planar surfaces 1543, 1547 facing each other.

Further, the hemispheres are modified to create the body portions 1542, 1546 as the polar caps or poles are removed to create planar, recessed outer surfaces 1544 and 1548 (note, the polar caps or poles likely would not be removed as the body portions 1542, 1546 often will be formed using injection molding of a hard plastic or rubber or using other processes not involving material removal to form the rollers 1540, 1550). The two body portions or sphere halves 1542, 1548 are mounted on a support pin/axle (or pins/axles) 1545 and rotate about a minor rotation axis of the omniwheel 1510 corresponding with the center or longitudinal axis of the pin 1545. The roller 1550 has a similar makeup as roller 1540 but is rotated 90 degrees such that only one body portion or hemisphere 1552 can be seen with its recessed outer surface 1554 and with its support pin 1555 about which the body portion 1552 rotates as shown with arrow 1559. Gears 1532, 1536, and 1538 are shown to provide the 1:1 coupling of the shafts 1530, 1534 but other techniques such as one or more belts may be used in other embodiments of the omniwheel 1510. Some compliance/backlash may be acceptable in this coupling as long as one of the rollers 1540, 1550 is touching/contacting a supporting surface during use of the omniwheel 1510 in an omnidirectional wheel assembly.

FIGS. 13A-14B illustrate that three or more rollers or spheres may be used instead of two rollers/spheres in the in-line versions. Likewise, it should be understood that the side-by-side version of an omniwheel 1510 shown in FIG. 15 may readily be modified as discussed with reference to FIGS. 13A-14B to include three (or more rollers). For example, two outer rollers (of the same or larger diameter depending on whether the omniwheel will be used on a flat or curved surface) may be provided in a side-by-side omniwheel. Instead of a single coupling shaft and gear as shown with shaft 1537 and gear 1538 in FIG. 15, the three-sphered, side-by-side omniwheel would include two coupling shafts and gears (or belts or other coupling arrangements may be used) with one between each of the outer rollers and the center or inner roller. All the main shafts would be coupled, e.g., with a 1:1 connection using gears, belts, or the like or using software of a controller if each shaft were driven separately rather than driving one of the shafts to rotate all main shafts.

It should be understood that each of the omniwheel designs described herein may be incorporated in any of the wheel assembly, and, in such wheel assemblies, motors or other drive devices may be included to power each omniwheel in an independent manner. For example, each omniwheel of the assembly may be separately powered to rotate about its major axis. In some embodiments (not shown), motors or drivers may be provided in each sphere to cause each roller to be independently driven and controlled, whereas the examples of the figures show freewheeling/rotating of each roller of each omniwheel about its minor axis (e.g., about a minor shaft or pin extending from the main shaft or other support through the two hemispherically-shaped body portions of the roller).

Figure 16:
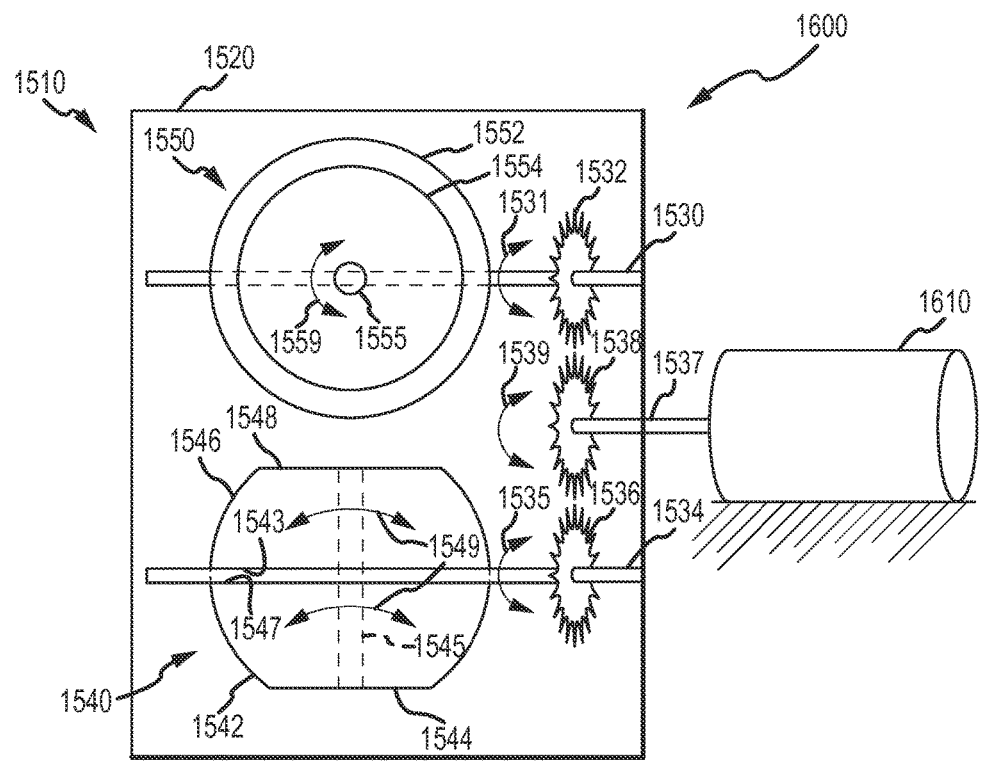
FIG. 16 illustrates a portion of an omnidirectional wheel assembly of the present description showing a motor being used to power an omniwheel with the design shown in FIG. 15.
Figure 17:
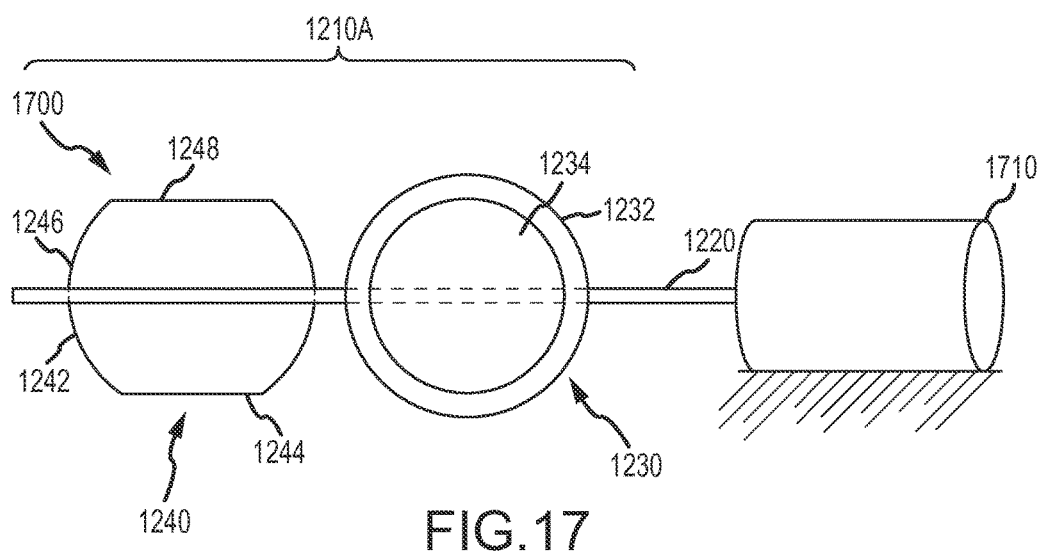
FIG. 17 illustrates a portion of another omnidirectional wheel assembly of the present description showing a motor being used to power an omniwheel with the design shown in FIG. 12C.

With this in mind, FIG. 16 illustrates a portion (one of typically four or more omniwheels) of an omnidirectional wheel assembly 1600 of the present description showing a motor 1610 being used to power an omniwheel 1510 with the design shown in FIG. 15. Particularly, the output shaft of the motor 1610 is the center drive shaft 1537 of the omniwheel 1510, and its rotation 1539 causes concurrent rotation 1531, 1535 of both main shafts 1530, 1534 of the rollers 1550, 1540, respectively, via the three meshed gears 1532, 1536, and 1538. The motor 1610 would be selectively controlled by a wheel assembly controller (not shown in FIG. 16) to choose the direction of rotation 1539, the speed of the rotation 1539, and the timing of when the rotation 1539 occurs to cause the omniwheel 1510 and the wheel assembly 1600 and any supported objects mounted upon the wheel assembly 1600 to move in a desired manner. Likewise, FIG. 17 illustrates a portion of an omnidirectional wheel assembly 1700 showing a motor 1710 being used to power an omniwheel 1210A with the design/configuration shown in FIG. 12C. The output of the motor 1710 is provided via main shaft 1220 of the omniwheel 1210A to cause rotation 1221 of the shaft 1220 and attached rollers 1230 and 1240.

Figure 18:
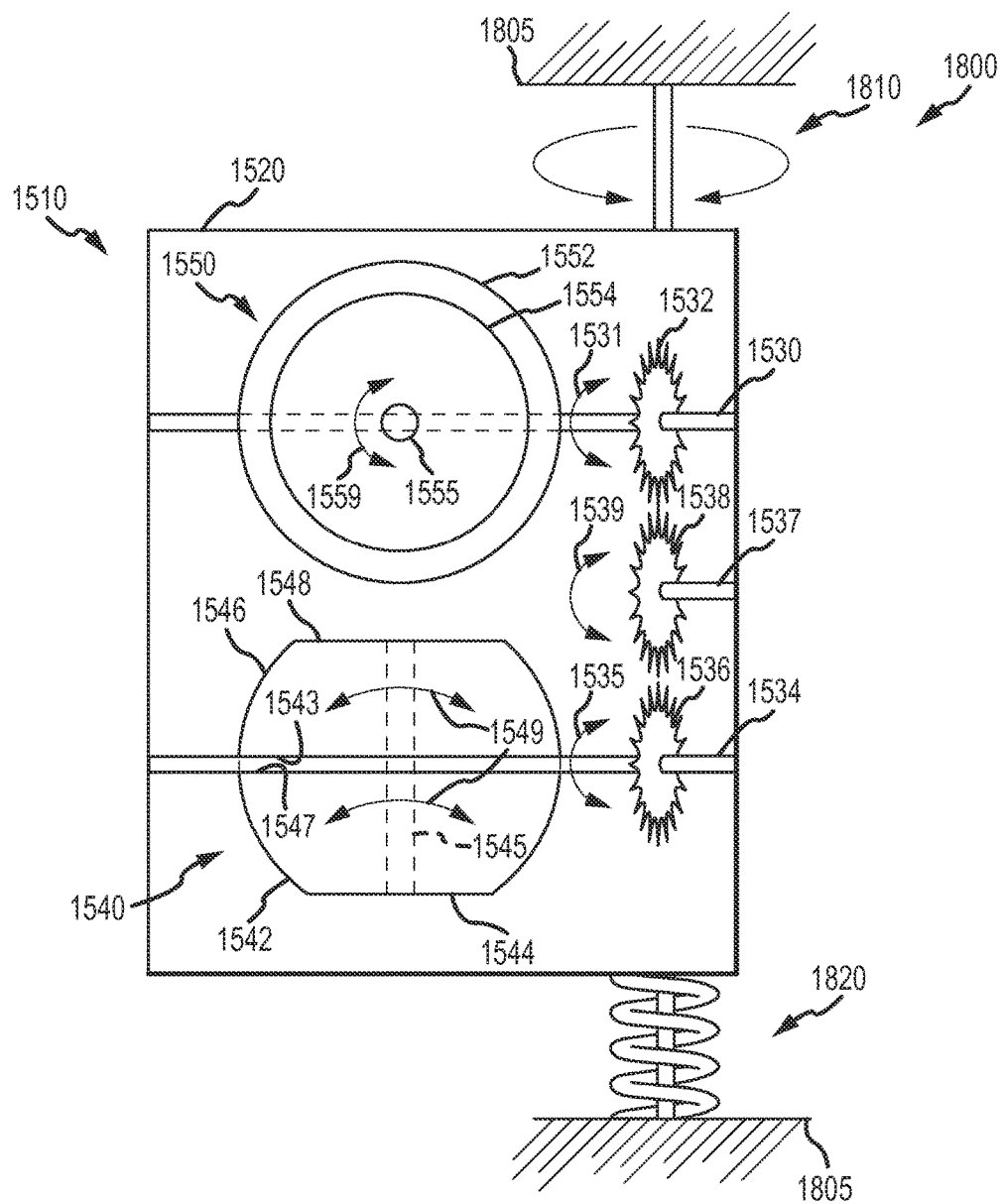
FIG. 18 illustrates a portion of an embodiment of an omnidirectional wheel assembly that is configured to include suspension in the support frame for its omniwheels (such as the omniwheel of FIG. 15 or other omniwheels designs taught herein)

FIG. 18 illustrates a portion (e.g., a single omniwheel rather than all four or more typically included) of an embodiment of an omnidirectional wheel assembly 1800. The inventors recognized that suspension may be added to an omniwheel assembly to raise and lower the spheres or rollers with both spheres/rollers moving together toward or away from a surface upon which the omniwheel is positioned. The wheel assembly 1800 illustrates with a schematic how suspension may be included in the support frame for its omniwheels (such as the omniwheel of FIG. 15 or other omniwheels designs taught herein).

Particularly, the wheel assembly 1800 includes a suspension element 1810 that may be used, in part, to support the omniwheel 1510 on a support frame 1805 of the wheel assembly 1800. The suspension element 1810 may take a wide variety of forms well known in vehicle and related arts and is configured to rotate about an outer axis to raise/lower the rollers 1540, 1550 against an underlying surface. Further, the wheel assembly 1800 may include a biasing element (e.g., a rotational spring) 1820 coupling the omniwheel 1510 to the support frame 1805 of the wheel assembly 1800, and biasing element 1820 may be configured to retain a pressure between the rollers 1540, 1550 and the underlying surface.

Figure 19:
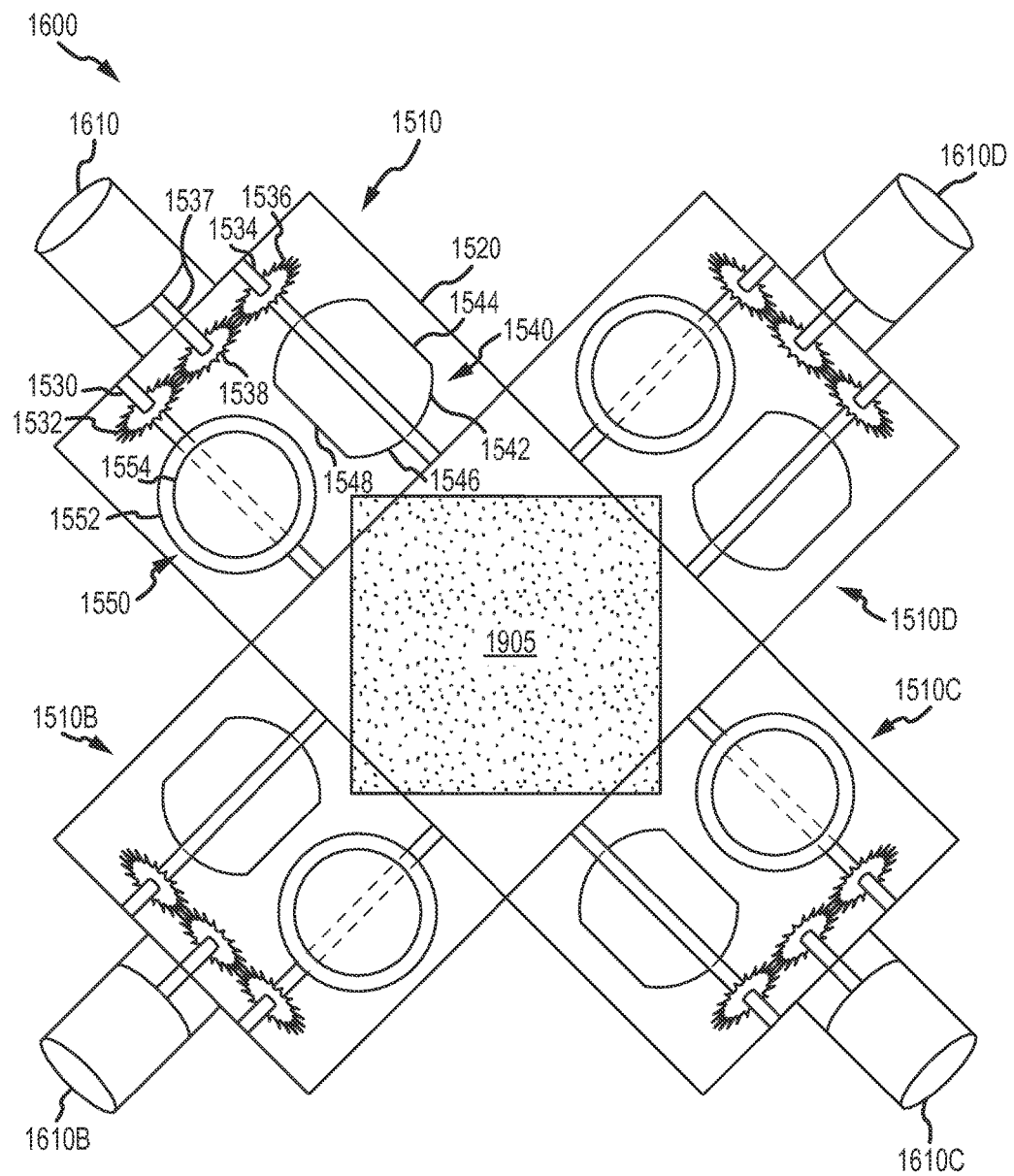
FIG. 19 illustrates in more detail the omnidirectional wheel assembly of FIG. 16 showing all four omniwheels of the assembly.

FIG. 19 illustrates in more detail the omnidirectional wheel assembly 1600 shown only partially in FIG. 16. As can be seen, the wheel assembly 1600 is a powered design that includes four motor-driven omniwheels 1510, 1510B, 1510C, and 1510D with their wheel supports interconnected as shown to provide wheel support frame. The components of the omniwheel 1510 are identified with reference numerals and like components are included in omniwheels 1510B, 1510C, 1510D such that numbering is not believed necessary for full understanding of the wheel assembly 1600.

The motor 1610 is shown to be outboard, but it may be desirable for weight distribution and other reasons to position the motor 1610 (and the other three motors) more centrally with the rollers 1540, 1550 positioned further toward the edges of wheel support 1520. The four-wheel design for wheel assembly 1600 provides a guaranteed area of support 1905, and a stable omnidirectional device (e.g., a vehicle) may be provided by positioning a support object(s) (e.g., a vehicle body and control components for the motors as well as the motors themselves) over the area of support 1905. An unpowered, four-wheel assembly may be provided by modifying the wheel assembly 1600 to not include motors/drivers (e.g., removing the motor 1610 from omniwheel 1510).

Figure 20:
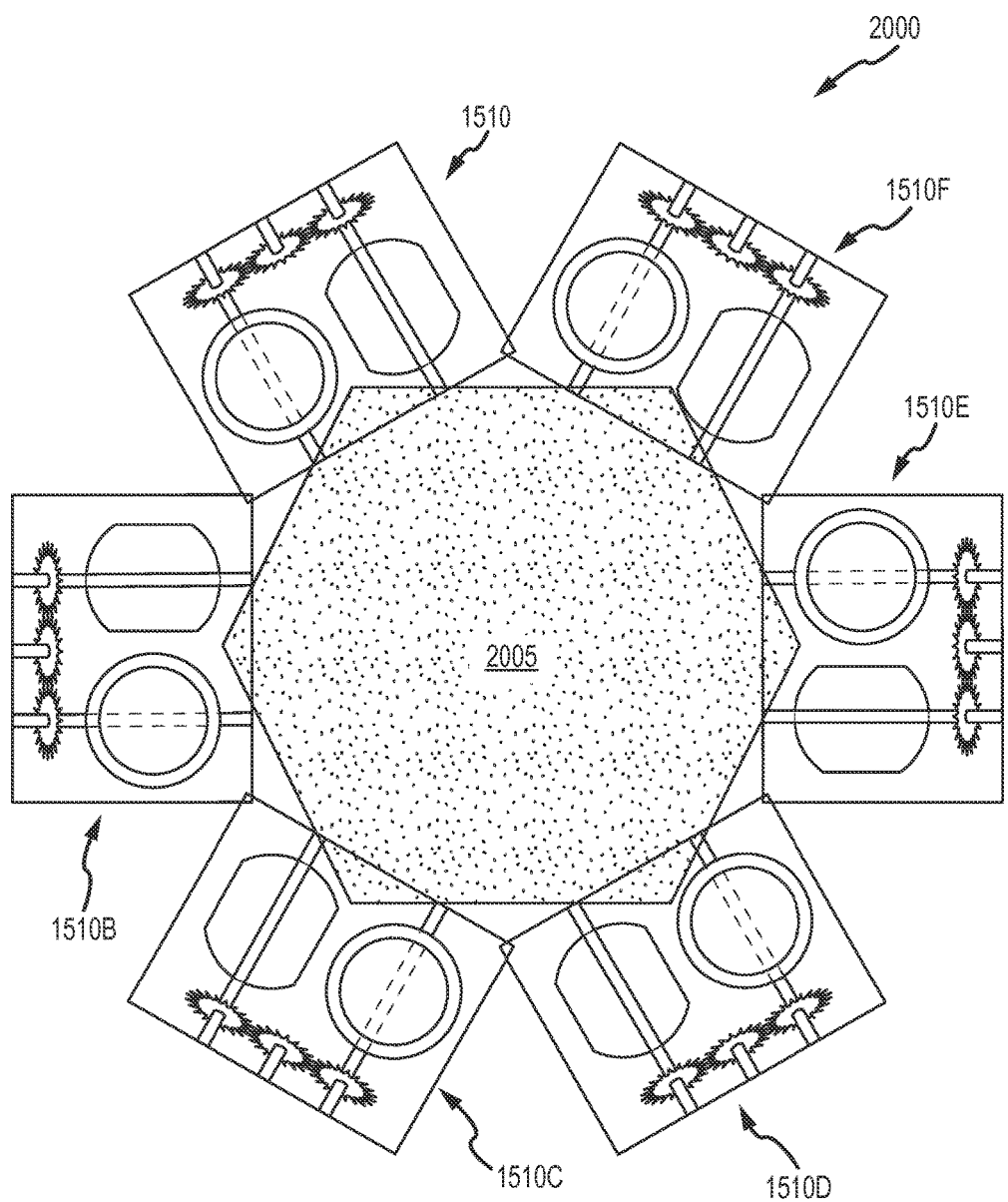
FIG. 20 is a top view of a six-wheeled version of an omnidirectional wheel assembly using non-powered, side-by-side omniwheels.

With the above teaching in mind, one skilled in the art will readily understand that the number and arrangement of the omniwheels taught in a wheel assembly may vary widely to practice the invention (e.g., are not limited to the four-wheel design of FIG. 19). For example, FIG. 20 illustrates a six-wheel design for an omnidirectional wheel assembly 2000 that may be used to provide a larger guaranteed area of support 2005 than the four-wheeled design of assembly 1600 shown in FIG. 19, and it is likely that the wheel assembly 2000 would have greater stability in use than the four-wheeled assembly 1600.

Any of the omniwheels taught herein may be used for a six-wheeled design. However, for illustration, the wheel assembly 2000 is shown to include the side-by-side, two-roller omniwheel 1510 with the other five omniwheels 1510B-1510F having a like design (and similar component numbering). The wheel supports 1520-1520F are interconnected to provide a wheel support frame for the wheel assembly 2000 with, in this example, their inner walls forming a hexagon. The wheel assembly 2000 can, of course, be modified to be powered such as by adding a driver or motor to each of the omniwheels 1510-1510F to selectively cause each of these omniwheels to rotate about its major axes coinciding with the main shafts supporting the rollers.

Figure 21:
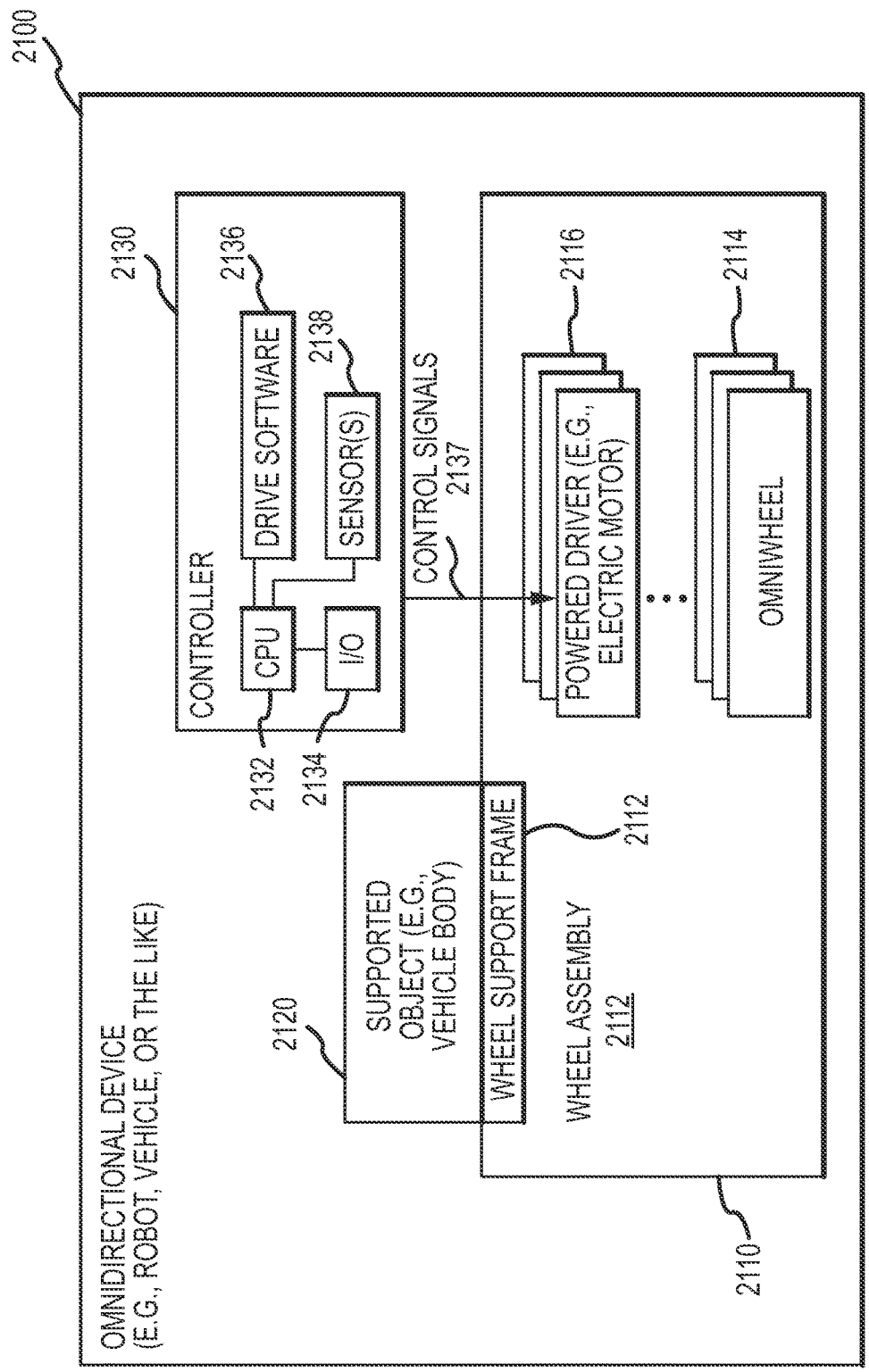
FIG. 21 is a functional block diagram of an omnidirectional device (such as a robot, a park ride or other vehicle, and the like) showing use of a controller to selectively operate drivers to power/rotate omniwheels using the multi (two or more) roller or sphere design taught herein.

FIG. 21 is a functional block diagram of an omnidirectional device (such as a robot, a park ride or other vehicle, and the like) 2100 showing use of a controller 2130 (onboard or offboard and in wired or wireless communications with the wheel assembly 2110) to selectively operate drivers (e.g., electric motors) 2116 to power/rotate omniwheels 2114 of the multi (two or more) roller or sphere design taught herein.

As shown, the omnidirectional device 2100 includes a wheel assembly 2110 that may take any of the forms of omnidirectional wheel assemblies discussed herein or a modification thereof. The wheel assembly 2110 includes a wheel support frame 2112 and a number (e.g., 2 to 6 or more) of omniwheels 2114, and the omniwheels 2114 may be configured with in-line rollers (or spheres) or with side-by-side rollers (or spheres). In some cases, the device 2100 may be non-powered (or non-motorized), but, in many cases as shown, the wheel assembly 2110 may include a powered driver (e.g., an electric motor) 2116 for driving each of the omniwheels 2114 (e.g., typically at least one driver 2116 will be provided per omniwheel) such as by selectively rotating a main shaft of the omniwheel 2114 in a particular direction and at a particular speed.

The wheel assembly 2110 includes a wheel support frame 2112 that may be used to support the drivers 2116 as well as to pivotally support the main shafts of the omniwheels 2114. As discussed above, the number and arrangement of the omniwheels 2114 may be chosen to provide a desired area of support, and a supported object 2120 may be positioned on the wheel support frame 2112 (or on a platform on the frame 2112) on or over this area of support of the wheel assembly 2110. The supported object 2120 may take nearly any form such as the body of a robot, a vehicle frame/body, or the like.

The omnidirectional device 2100 further includes the controller 2130 that is configured to generate and transmit (in a wired or wireless manner) the control signals 2137 to the drivers 2116 to power/rotate the omniwheels 2114. The controller 2130 includes a processor(s) 2132 that function to access memory and/or execute code (or programmed instructions) including the drive control software 2136 (which may be provided in nearly any computer-readable media). The drive control software 2136 may process input from sensors 2138 to determine which omniwheels 2114 to operate and in what manner (speed and direction) to achieve a desired movement of the device 2100 over a surface (smooth or bumpy (or with other obstacles)).

The sensors 2138 may be configured to provide the present location of the device 2100 on the surface or relative to objects, the present speed of the device 2100, and the present direction of travel. This information may be processed by the drive control software 2136 and compared with a predefined travel path and travel speeds in memory accessible by the software 2136 (or CPU 2132). In other cases, though, the CPU 2132 may manage input/output devices 2134 (e.g., a joystick, a steering wheel, a gas pedal, a keyboard, a touchscreen, and the like) that a user/operator (not shown) may operate to provide inputs to guide the direction and/or speed of travel of the device 2100 over a surface, and the drive control software 2130 may process this input data from the I/O devices 2134 to generate the control signals 2137 (in isolation or in combination with processing of sensor data from sensors 2138).

Control of omniwheeled vehicles and devices is relatively well known by those in the arts. With that in mind and in spirit of brevity, additional detail of how each of the omniwheels 2114 of the wheel assembly 2110 is controlled to move in a particular direction or to turn is not provided herein and it will be understood that the drive control software 2136 will be modified or differ for each of the various designs for wheel assembly 2110 described herein (e.g., will differ for a four-wheeled vehicle and a six-wheeled vehicle and for an inline omniwheel and a side-by-side omniwheel).

Note, each of the axles/shafts of a side-by-side or even inline omniwheel 2114 may be powered (not just a pair by each sphere/roller), and then it would be possible to coordinate the motions with in software such as drive control software 2136 thus allowing removal of interconnecting gears (or belts). In such embodiments, it is also sometimes useful to arrange the spheres/rollers of the omniwheels without the pairs being parallel to each other, and the controller 2130 (or drivers 2116) would be configured to determine which spheres/rollers are out of contact with a surface and for reestablishing contact quickly and/or as appropriate.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, many of the examples of wheel assemblies provided above (such as those in FIGS. 7-9) shows the roller pairs (or sets when more than two rollers are used) arranged in an outward-extending or spoke-like pattern from the center of the support frame. In other wheel assembly embodiments, the pairs of rollers may be aligned in other patterns or configuration such as in a circular pattern with the pattern's center coinciding with the center of the support frame or in other patterns (such as with the support rods or drive shafts forming a square when the wheel assembly includes four omniwheels).

Also, many of the wheel assembly examples show pairs of rollers in each omniwheel but each omniwheel may be provided using three or more rollers (e.g., pairs of hemispherically-shaped body portions) to provide different patterns of contact points for the omniwheel when compared with use of a pair of rollers. In general, a key aspect of the wheel assemblies taught herein involves using a variable pattern of contact points to allow multiple spheres or rollers (typically, with a poles or polar caps removed) to act as omniwheels or omnidirectional wheel elements. This removes the need for smaller diameter rollers, which limits previous omniwheel designs.

In the above description, it should be remembered that the term "subsurface" is equivalent to polar cap removal. The description discusses providing a subsurface by slicing through the sphere and cutting off the polar cap. The description discusses and figures show this being a planar surface. However, in practice, nothing should touch this surface such that it can be any shape. In practice, it actually may be indented into the sphere to save weight.

The spheres can be driven individually along their respective minor axes. In many cases, though, it may be more useful to drive both spheres together via the shared/interconnected major axis. The description is not limited to this implementation as it may also be useful to also (or instead) drive the individual minor axes, either with motors inside the spheres or from outside via some belt/gear arrangement.

Figure 22:
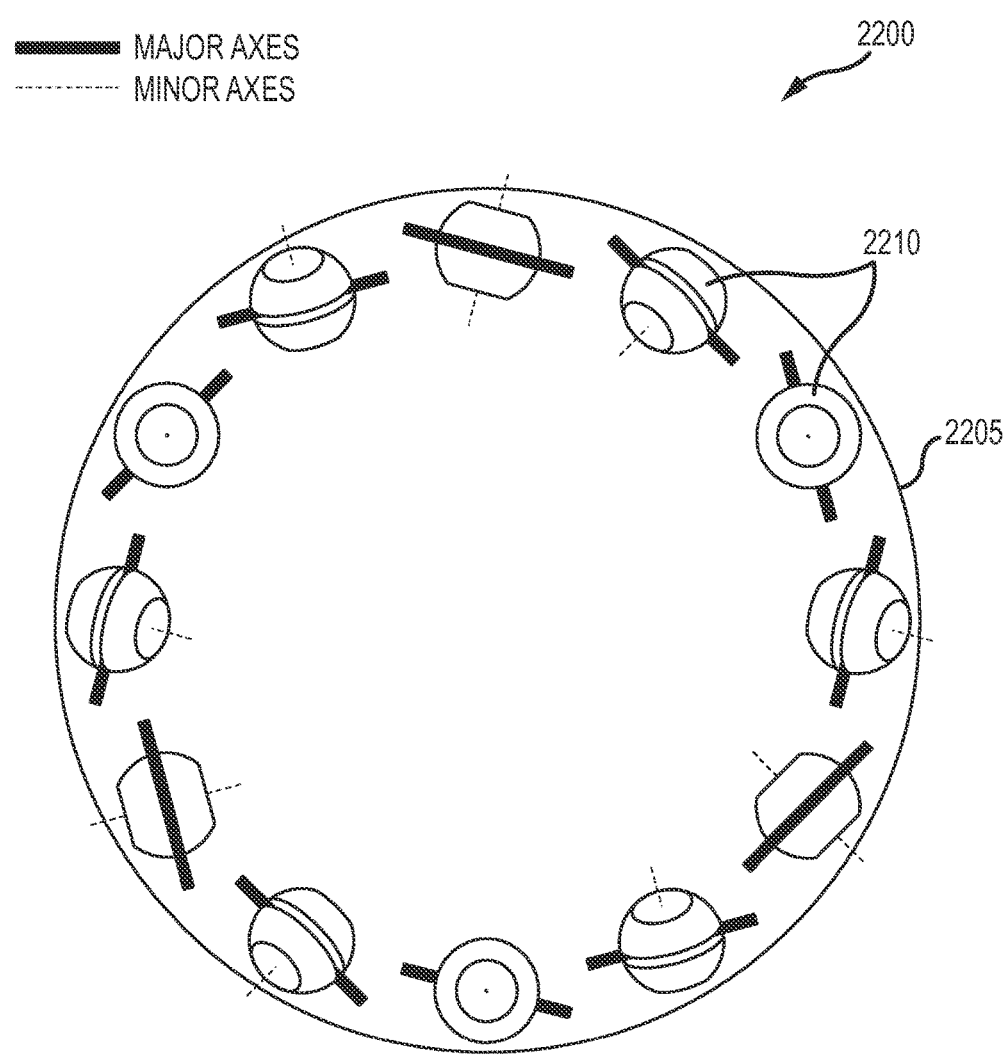
FIG. 22 is a simplified top view of another useful embodiment of an omnidirectional wheel assembly in which the drive and/or rotation axes are non-parallel.

In the prior description, it was taught that the pairs can be separately driven and then coordinated in software (versus by gears). In such embodiments, the shafts do not need to be parallel. In this regard, FIG. 22 illustrates an additional embodiment of an omnidirectional wheel 2200 with a body or hub 2205 upon which are provided a plurality of rollers 2210. The omnidirectional wheel 2200 uses 12 individual spheres as the rollers 2210, with the 12 major axes all being non-parallel on a circular vehicle, assembly, or omnidirectional wheel 2200. Although not shown, drive motors may be provided or packaged inside the hollow space in the spheres/rollers 2210. Each drive motor may be configured for driving the major axes, though it may also drive the minor axis. The omnidirectional wheel 2200 likely could be implemented so as to provide a well-packaged and very versatile vehicle or assembly that includes the wheel 2200.

The spheres or rollers used herein may be fabricated in many ways to implement the new omniwheels. The spheres/rollers may be hollow shells in some cases while other implementations may use rims and tires.

Further, the omniwheels shown in the figures typically utilized a main drive shaft that was supported (e.g., by bearings) in a wheel support or frame element. In other embodiments (not shown), it may be useful to support each roller of an omniwheel with a yoke that extends around the outer surfaces of the rollers, with the yoke being supported from the central wheel support frame. In such embodiments, it may be possible to avoid the use of two hemispherical body portions and instead use a roller with a unitary body.

In some roller designs, it may be desirable to modify the design to use less material in each roller. For example, the roller may be provided with body portions or halves supported by a main shaft, but the body portions or halves (hemispheres) may be have material removed that is not needed as a contact surface. In other words, each body portion or half of a roller may be hollow dome with the polar cap or pole removed to expose the interior components of the body portion or half (e.g., to reveal components used to pivotally couple the body portion or hemisphere or half to the main shaft to allow the hollow dome to rotate freely (or in a powered manner) about a minor axis of the omniwheel).

We claim:

1. An omnidirectional wheel assembly, comprising:
   a wheel support frame; and
   a plurality of omniwheels mounted to the wheel support frame,
   wherein each of the omniwheels includes at least two spherically-shaped rollers of equal outer diameter,
   wherein each of the spherically-shaped rollers is pivotal both about a minor axis extending centrally therethrough and a major axis extending orthogonal to the minor axis,
   wherein each of the spherically-shaped rollers includes a pair of recessed contact surfaces at opposite poles, and
   wherein the spherically-shaped rollers in each of the omniwheels are angularly offset from each other by at least 45 degrees as measured between the minor axes of adjacent pairs of the spherically-shaped rollers.

2. The omnidirectional wheel assembly of claim 1, wherein the recessed contact surfaces each has a depth in the range of 5 to 15 percent of the outer diameter of a corresponding one of the spherically-shaped rollers.

3. The omnidirectional wheel assembly of claim 1, wherein the spherically-shaped rollers have equal outer diameters in each of the omniwheels.

4. The omnidirectional wheel assembly of claim 1, wherein the major axis for each of the omniwheel corresponds with a shaft extending through and supporting each of the spherically-shaped rollers of the omniwheel, whereby the spherically-shaped rollers of each of the omniwheels is arranged to be inline.

5. The omnidirectional wheel assembly of claim 1, wherein the major axis corresponds with one of a number of parallel shafts pivotally mounted in each of the omniwheels and with the one of the parallel shafts extending through and supporting a corresponding one of the spherically-shaped rollers, whereby the spherically-shaped rollers of each of the omniwheels is arranged to be side-by-side.

6. The omnidirectional wheel assembly of claim 1, wherein each of the spherically-shaped rollers comprises a pair of spaced-apart, hemispherically-shaped body portions that are rotatable about the minor axis.

7. An omnidirectional wheel assembly, comprising:
a wheel support; and
at least four omniwheels mounted to the wheel support,
wherein each of the omniwheels includes at least two spherically-shaped rollers,
wherein each of the spherically-shaped rollers is pivotal both about a minor axis extending centrally therethrough and a major axis extending orthogonal to the minor axis, and
wherein the spherically-shaped rollers in each of the omniwheels are angularly offset from each other by at least 45 degrees as measured between the minor axes of adjacent pairs of the spherically-shaped rollers.

8. The omnidirectional wheel assembly of claim 7, wherein a pair of the spherically-shaped rollers have equal outer diameters.

9. The omnidirectional wheel assembly of claim 7, wherein each of the spherically-shaped rollers includes a pair of recessed contact surfaces at opposite poles and wherein the recessed contact surfaces each has a depth in the range of 5 to 15 percent of the outer diameter of a corresponding one of the spherically-shaped rollers.

10. The omnidirectional wheel assembly of claim 7, wherein the major axis for each of the omniwheel corresponds with a shaft extending through and supporting each of the spherically-shaped rollers of the omniwheel, whereby the spherically-shaped rollers of each of the omniwheels is arranged to be inline.

11. The omnidirectional wheel assembly of claim 7, wherein the major axis corresponds with one of a number of parallel shafts pivotally mounted in each of the omniwheels and with the one of the parallel shafts extending through and supporting a corresponding one of the spherically-shaped rollers, whereby the spherically-shaped rollers of each of the omniwheels is arranged to be side-by-side.

12. The omnidirectional wheel assembly of claim 7, wherein each of the spherically-shaped rollers comprises a pair of spaced-apart, hemispherically-shaped body portions that are rotatable about the minor axis.

13. An omnidirectional wheel assembly, comprising:
a wheel support frame; and
a plurality of omniwheels mounted to the wheel support frame,
wherein each of the omniwheels includes at least two spherically-shaped rollers of equal outer diameter,
wherein each of the spherically-shaped rollers is pivotal both about a minor axis extending centrally therethrough and a major axis extending orthogonal to the minor axis, and
wherein each of the spherically-shaped roller includes a pair of recessed contact surfaces at opposite poles.

14. The omnidirectional wheel assembly of claim 13, wherein the recessed contact surfaces each have a depth in the range of 5 to 15 percent of the outer diameter of a corresponding one of the spherically-shaped rollers.

15. The omnidirectional wheel assembly of claim 13, wherein the spherically-shaped rollers in each of the omniwheels are angularly offset from each other by at least 45 degrees as measured between the minor axes of adjacent pairs of the spherically-shaped rollers.

16. The omnidirectional wheel assembly of claim 13, wherein the spherically-shaped rollers have equal outer diameters in each of the omniwheels.

17. The omnidirectional wheel assembly of claim 13, wherein the major axis for each of the omniwheel corresponds with a shaft extending through and supporting each of the spherically-shaped rollers of the omniwheel, whereby the spherically-shaped rollers of each of the omniwheels is arranged to be inline.

18. The omnidirectional wheel assembly of claim 13, wherein the major axis corresponds with one of a number of parallel shafts pivotally mounted in each of the omniwheels and with the one of the parallel shafts extending through and supporting a corresponding one of the spherically-shaped rollers, whereby the spherically-shaped rollers of each of the omniwheels is arranged to be side-by-side.

19. The omnidirectional wheel assembly of claim 13, wherein each of the spherically-shaped rollers comprises a pair of spaced-apart, hemispherically-shaped body portions that are rotatable about the minor axis.

* * * * *